United States Patent [19]

Gill et al.

[11] Patent Number: 4,849,699
[45] Date of Patent: Jul. 18, 1989

[54] EXTENDED RANGE, PULSED INDUCTION LOGGING TOOL AND METHOD OF USE

[75] Inventors: Stephen P. Gill, Atherton; John D. Watson, Oakland; Keith O. Brink, San Jose, all of Calif.

[73] Assignee: MPI, Inc., Fremont, Calif.

[21] Appl. No.: 59,107

[22] Filed: Jun. 8, 1987

[51] Int. Cl.$^4$ .............................................. G01V 3/28
[52] U.S. Cl. .................................................... 324/339
[58] Field of Search ............... 324/333, 334, 338, 339, 324/340, 341, 342, 343, 336, 337

[56] References Cited

U.S. PATENT DOCUMENTS

| | | | |
|---|---|---|---|
| 3,034,042 | 5/1962 | Slack et al. | 324/339 |
| 3,317,744 | 5/1967 | Geleynse | 324/336 |
| 4,481,472 | 11/1984 | Glanzero | 324/339 |

*Primary Examiner*—Reinhard J. Eisenzopf
*Assistant Examiner*—Walter E. Snow
*Attorney, Agent, or Firm*—Owen, Wickersham & Erickson

[57] ABSTRACT

In accordance with the present invention, a pulsed induction logging system is provided which includes a logging sonde for traversing a borehole and having downhole microprocessor/controller circuitry in operative contact with a separate host computer/controller at the earth's surface. The host computer/controller and two downhole microprocessor/controllers constitute a network of digital computers and generate a digital pulsed logging code for periodically permitting a radiation coil to be driven by an oscillating current having high peak power. A powerful primary pulse of electromagnetic (EM) energy is periodically generated for irradiating the adjacent formation for induction logging purposes. The sonde also includes an antenna array for detecting secondary induced fields in the formation around the borehole. The array preferably includes a series of grouped, paired coils axially spaced along the borehole. Each group of paired coils independently detects the secondary field. Thereafter each detected signal per group of paired coils, is digitized, reformatted and transmitted to the host computer/controller at the earth's surface. The serially transmitted digital data is highly accurate and capable of frequency domain transformation in situ. After additional processing in the frequency domain, final displays are accurate indications of formation conductivity and/or dielectric values irrespective of adverse formation-borehole effects.

25 Claims, 19 Drawing Sheets

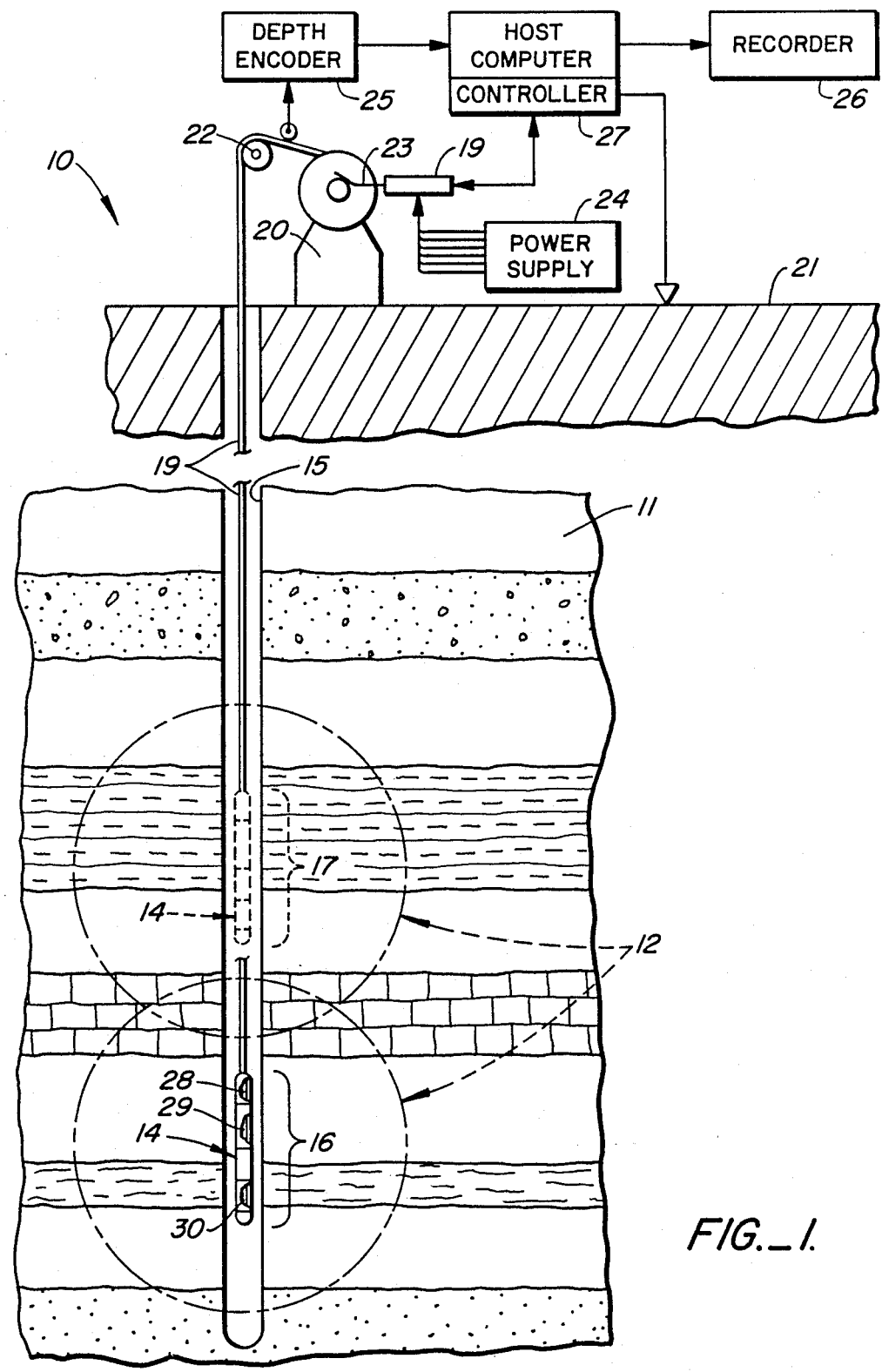
FIG._1.

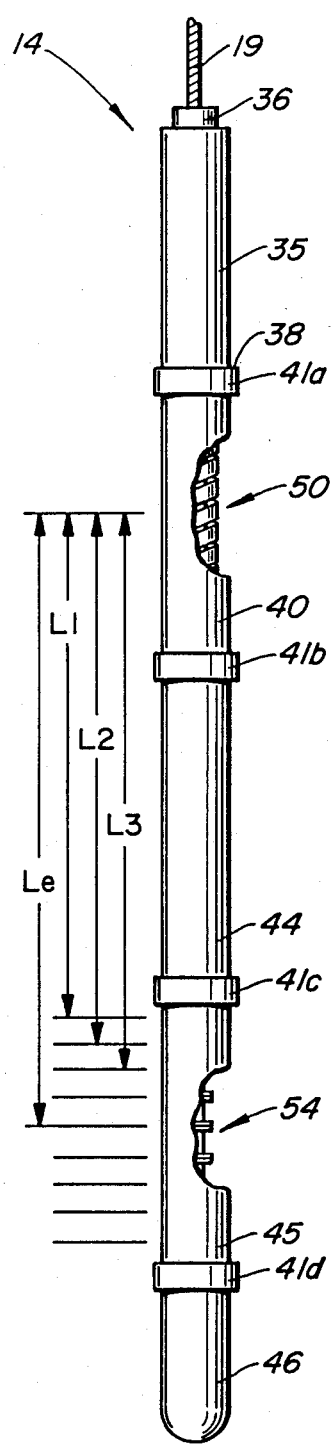
FIG._2.
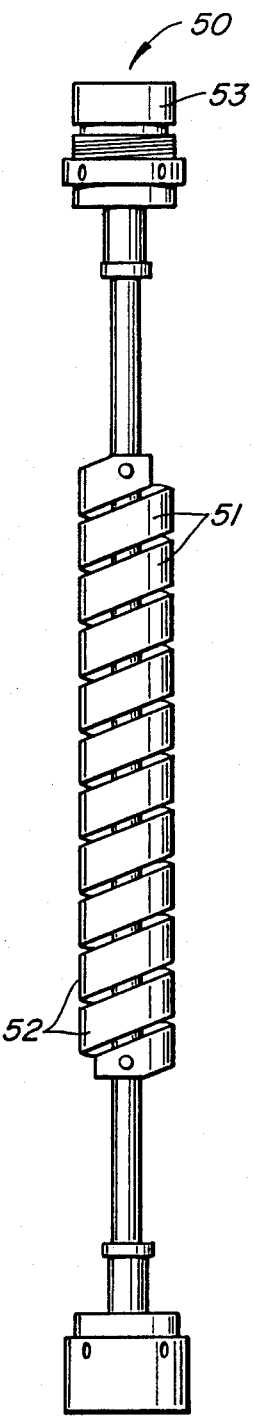
FIG._2A.
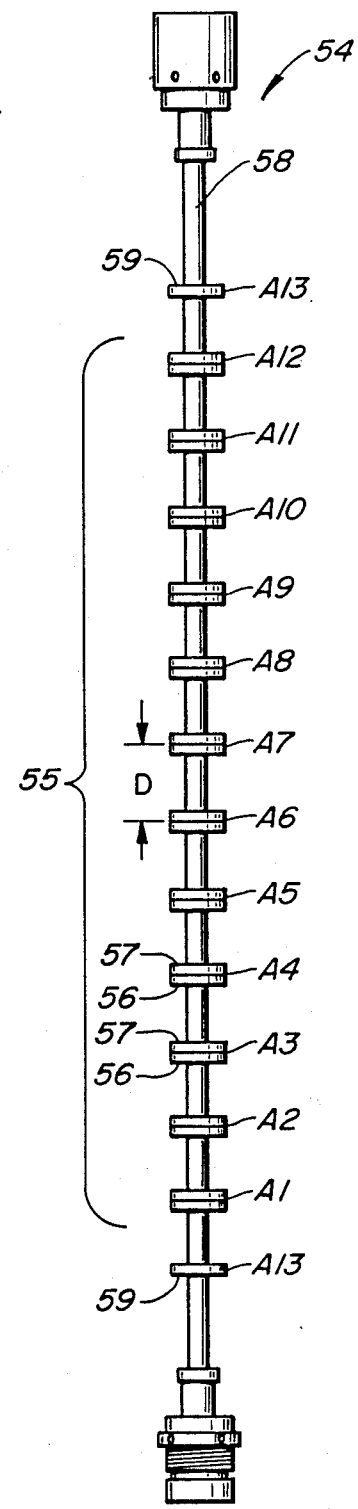
FIG._2B.

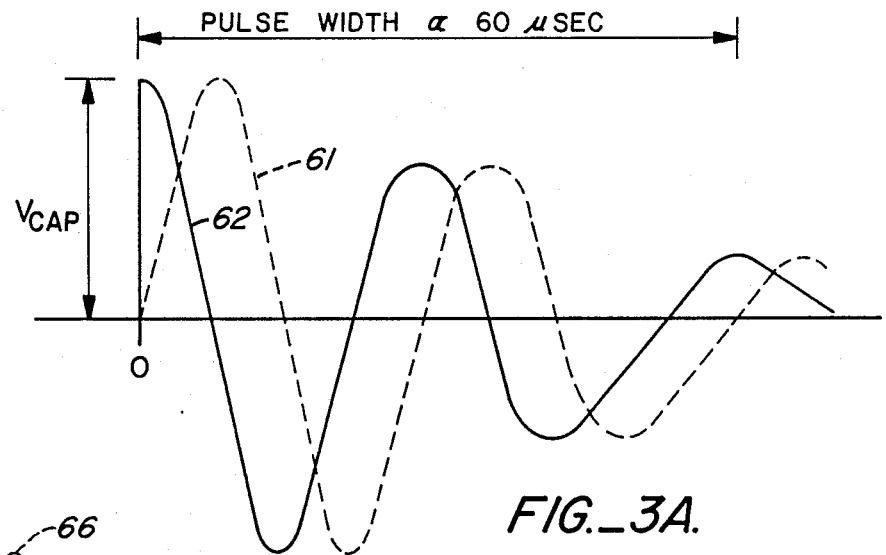
FIG._3A.
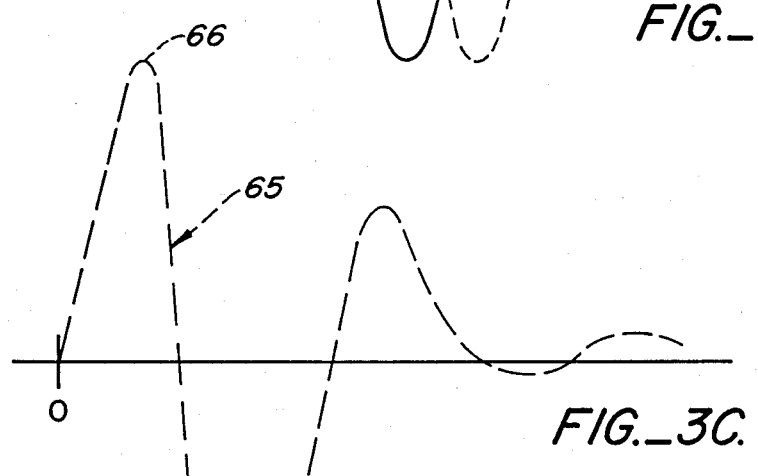
FIG._3C.
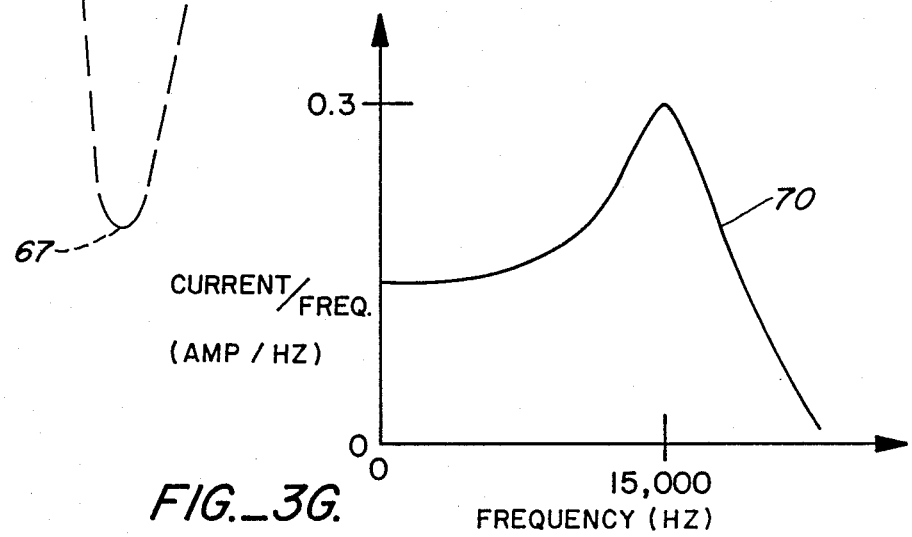
FIG._3G.

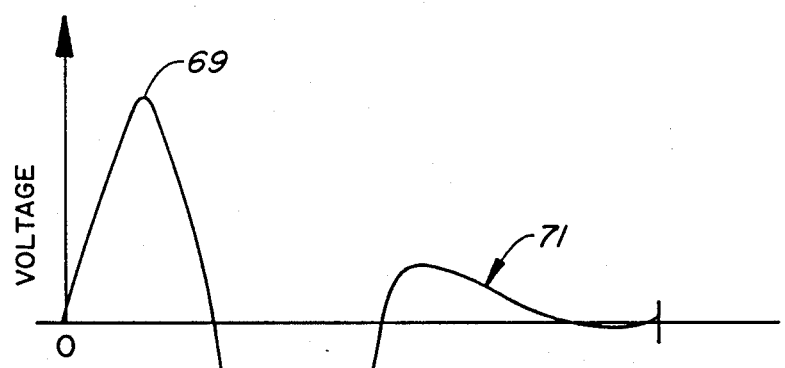
FIG._3D.
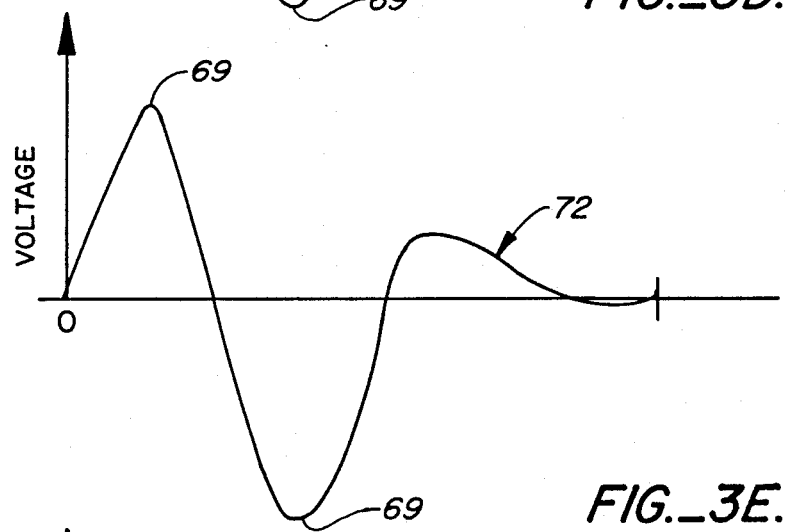
FIG._3E.
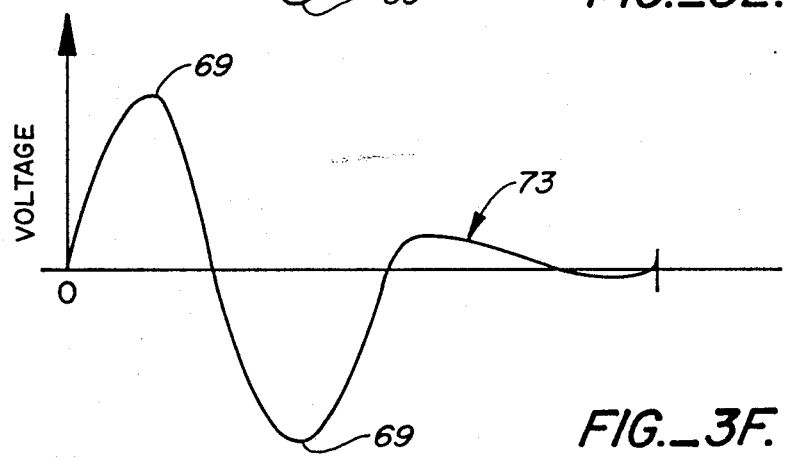
FIG._3F.

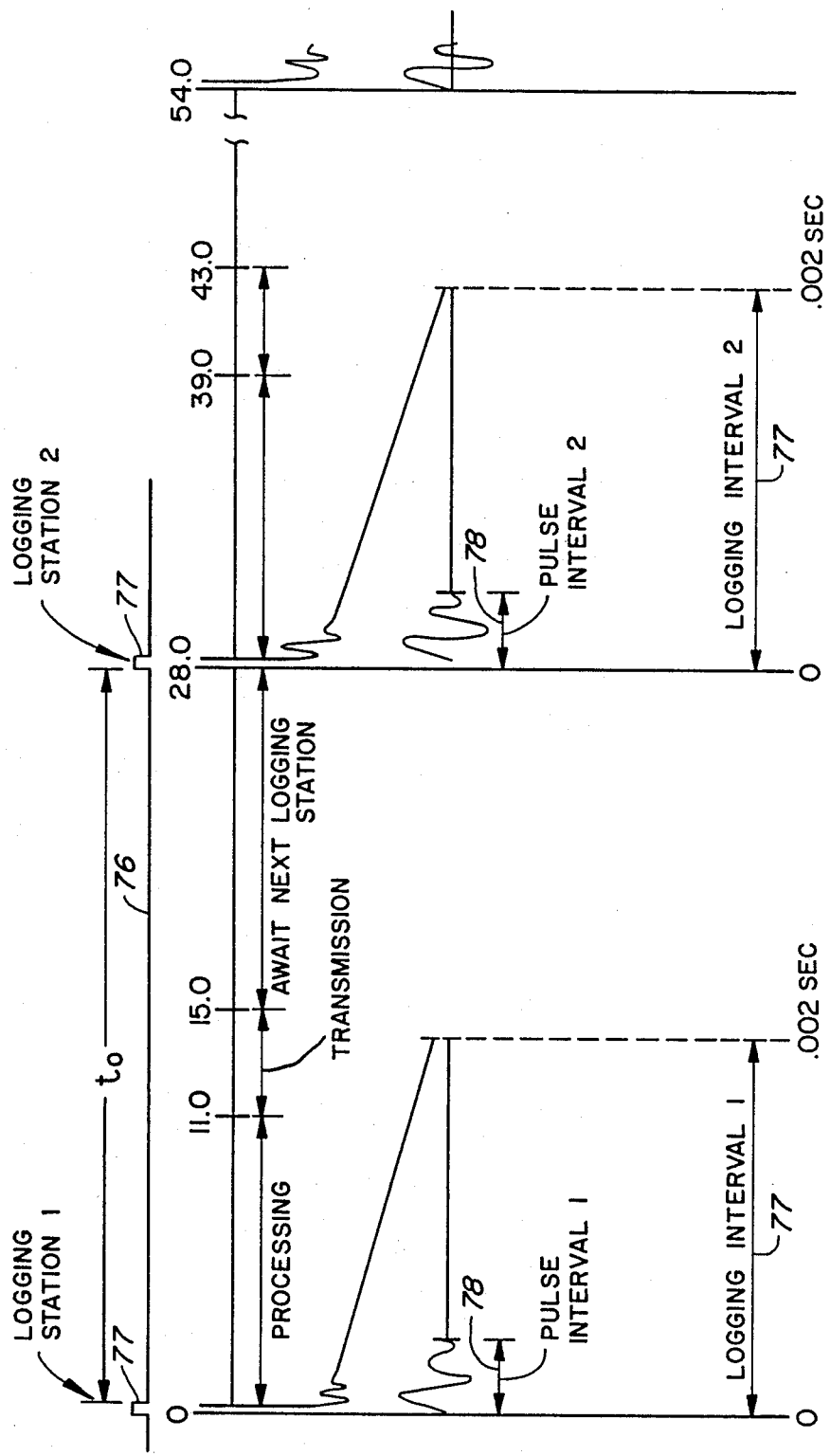
FIG._4.

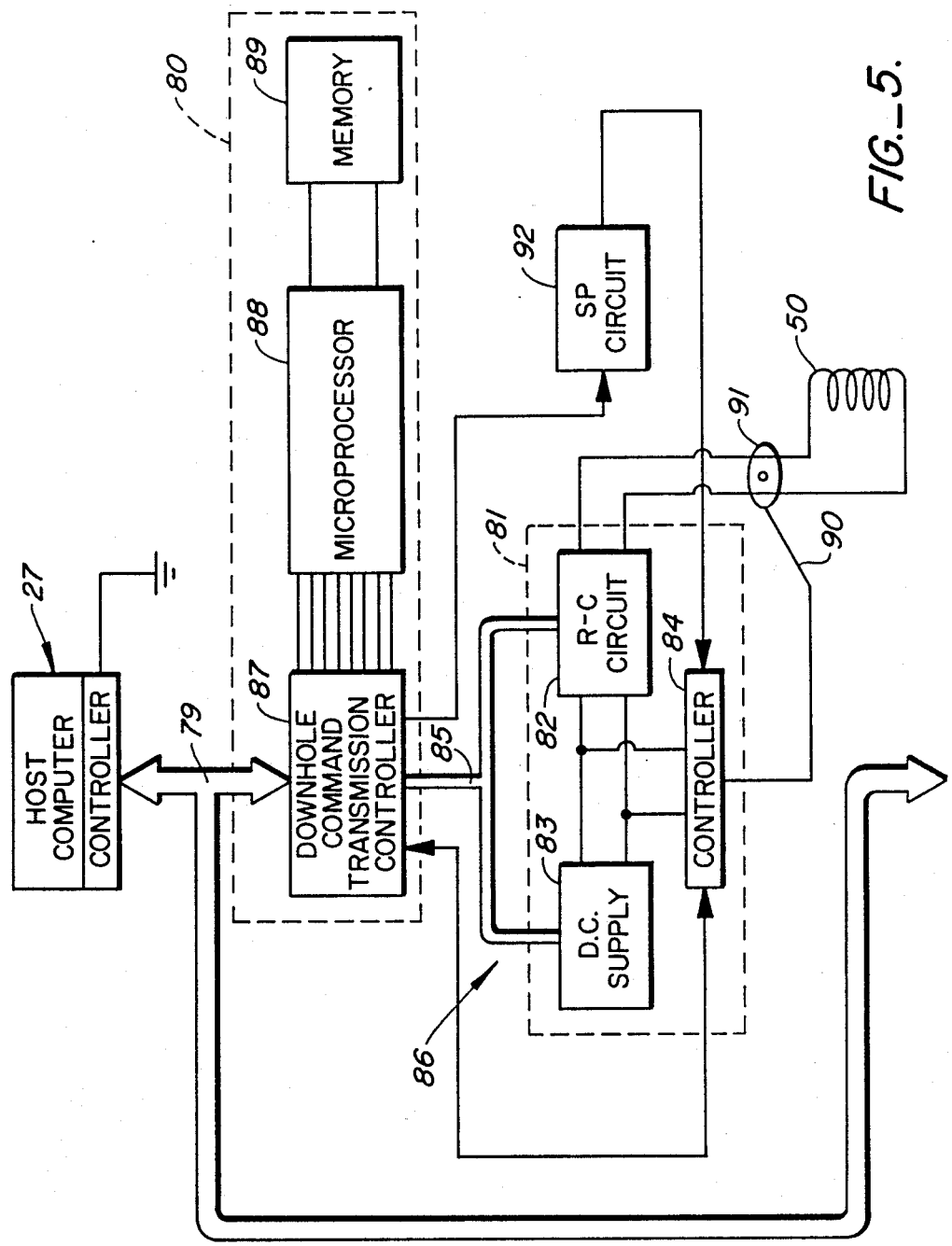
FIG._5.

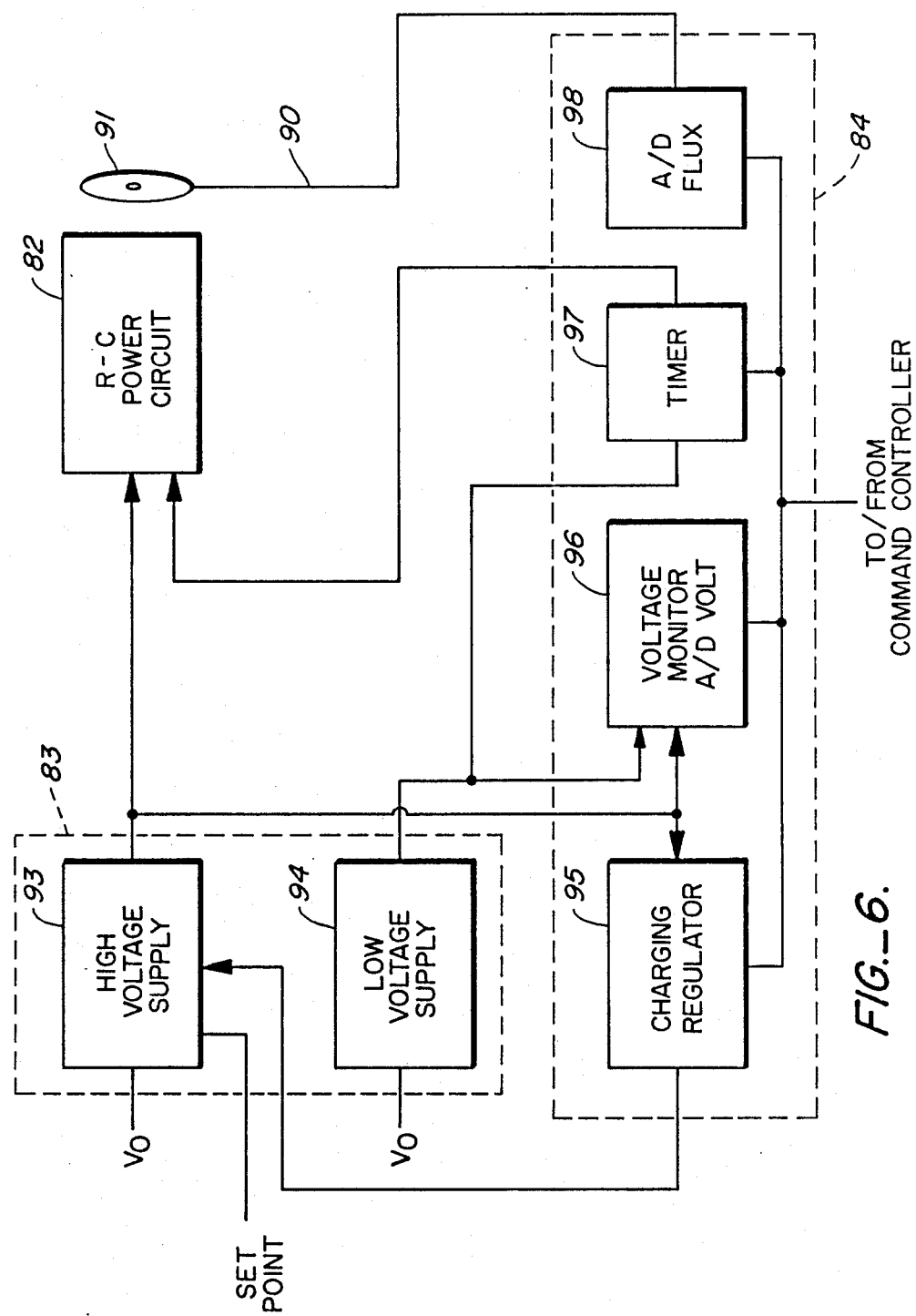
FIG._6.

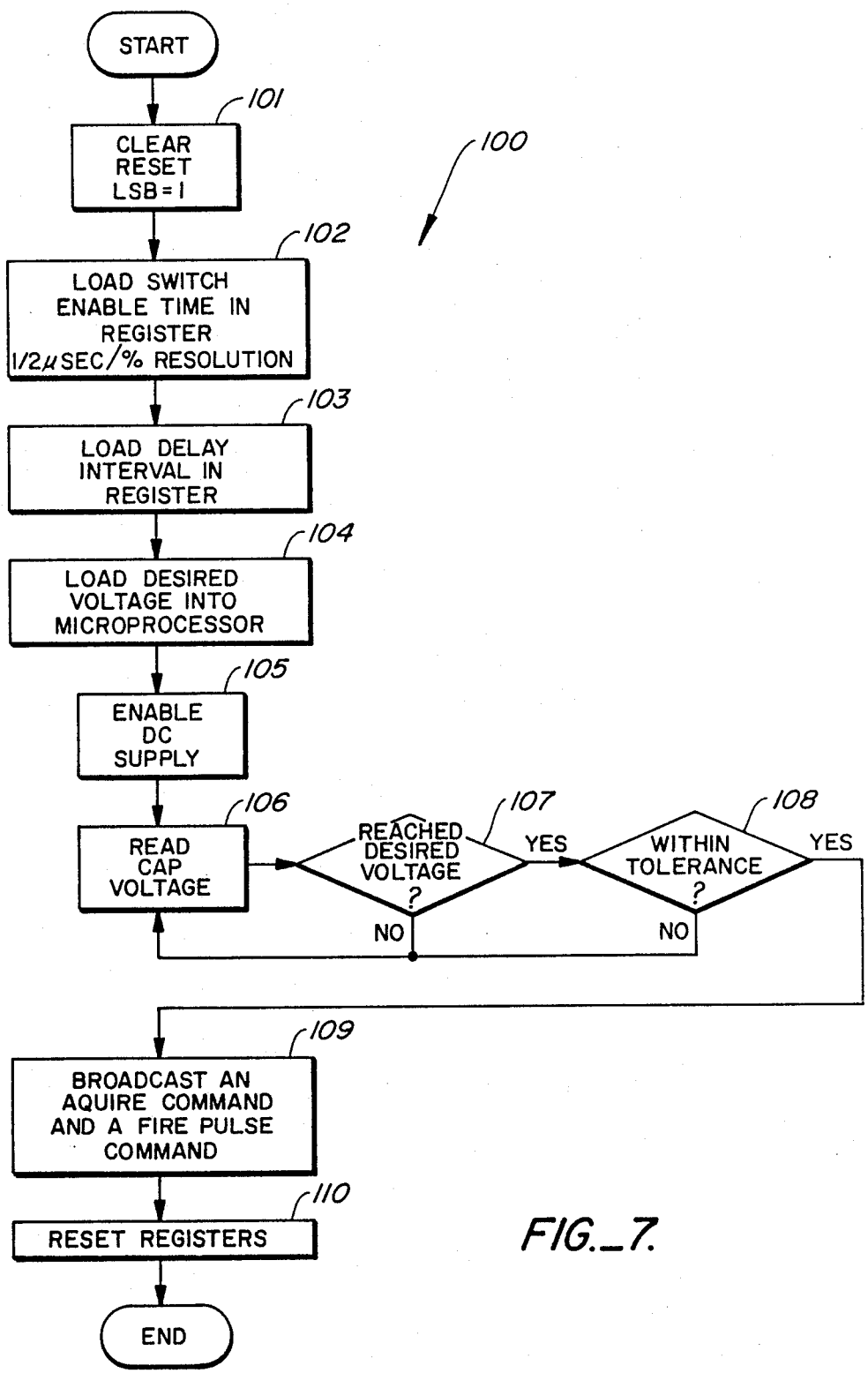
FIG._7.

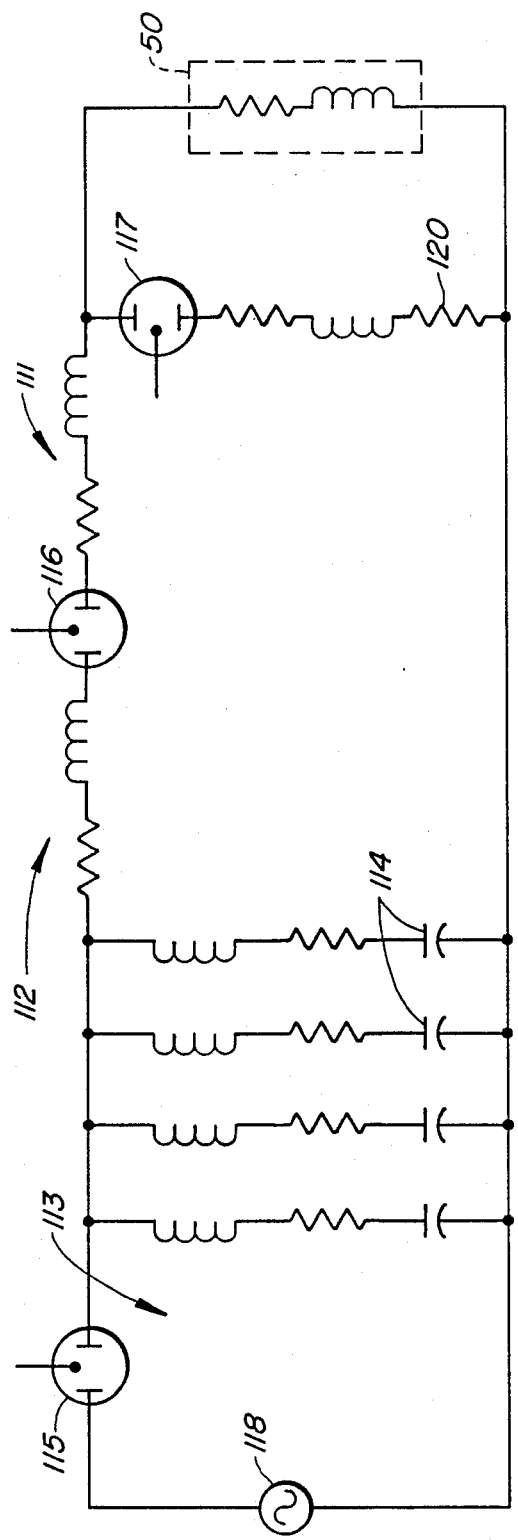
FIG._8.
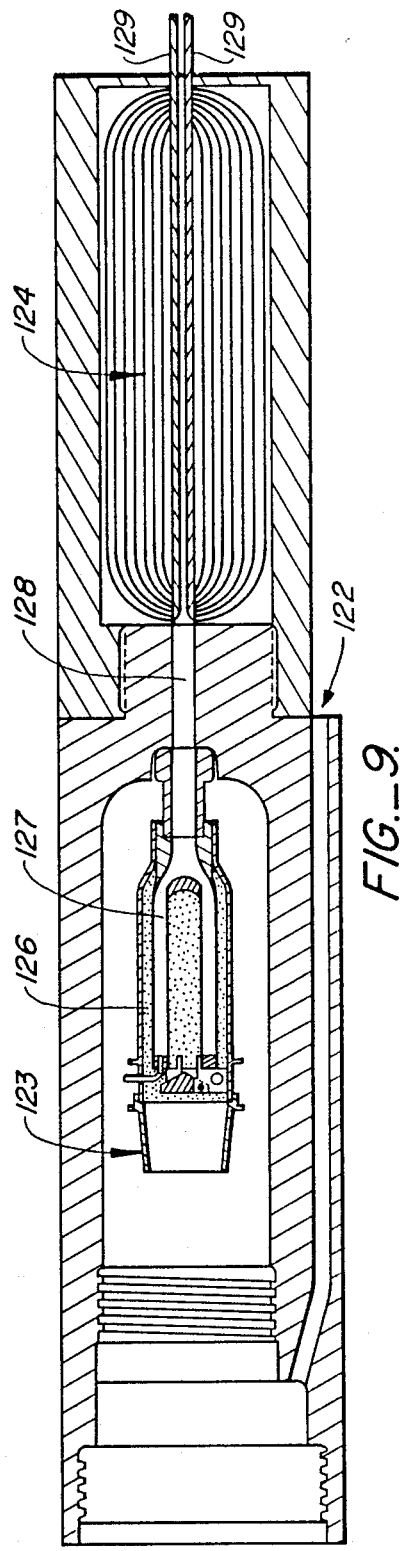
FIG._9.

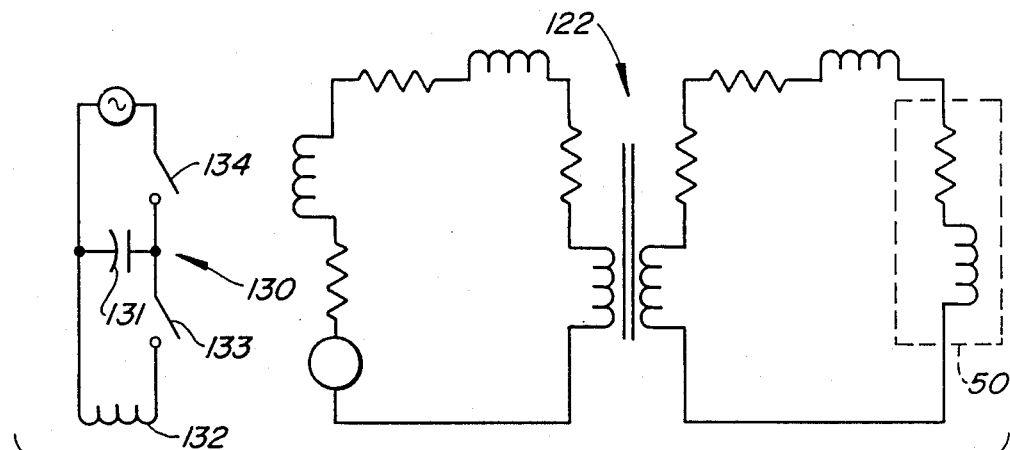
FIG._10.
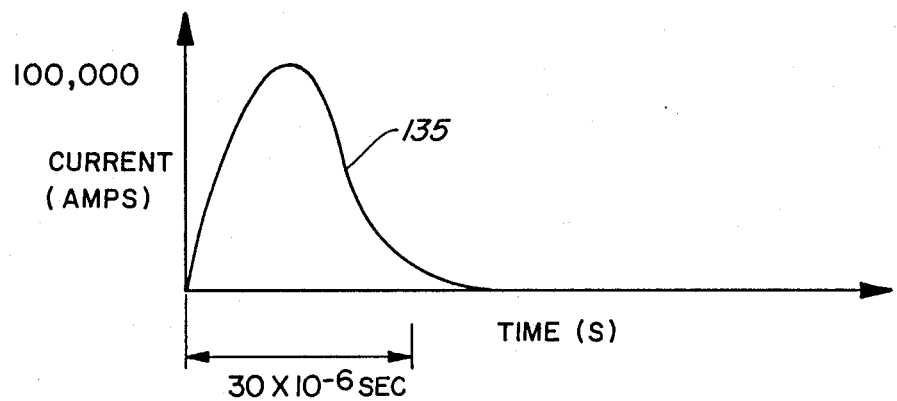
FIG._11A.
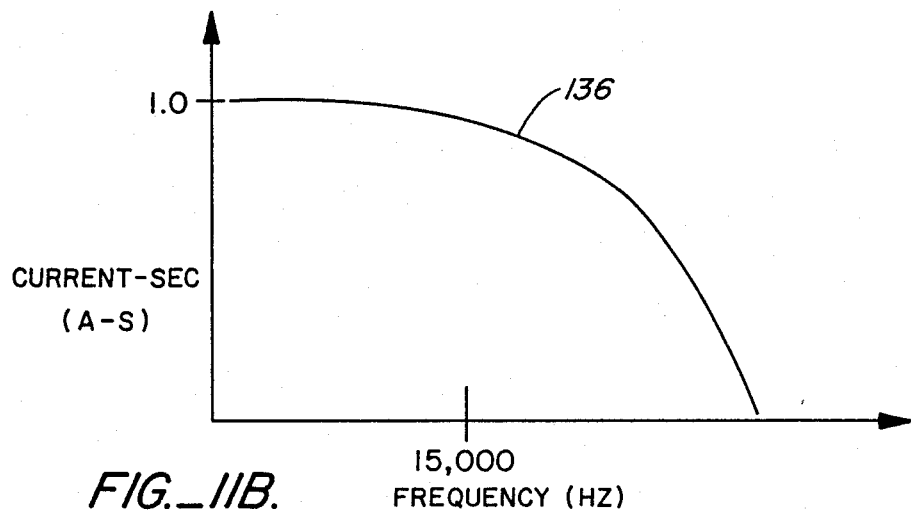
FIG._11B.

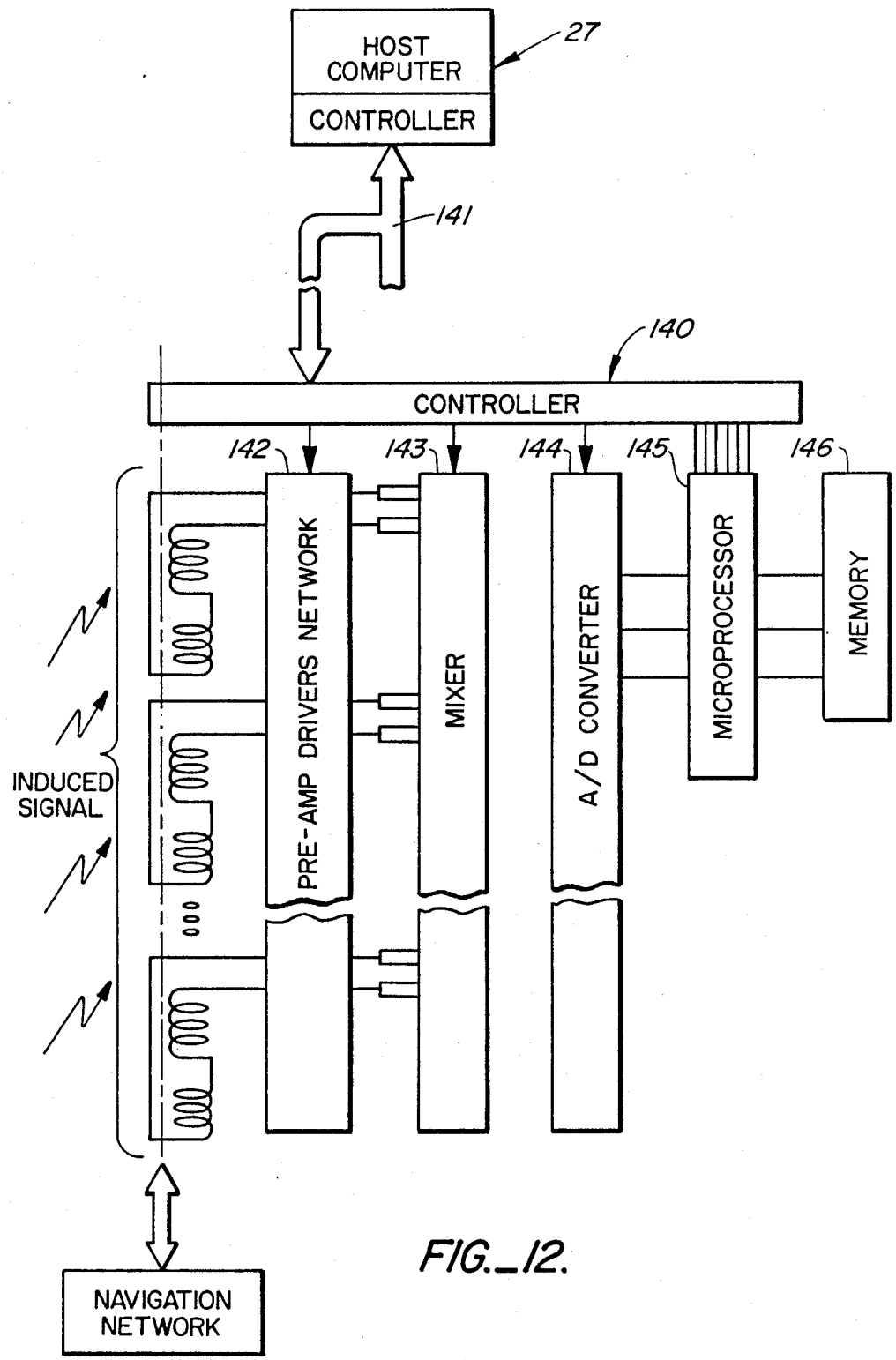
FIG._12.

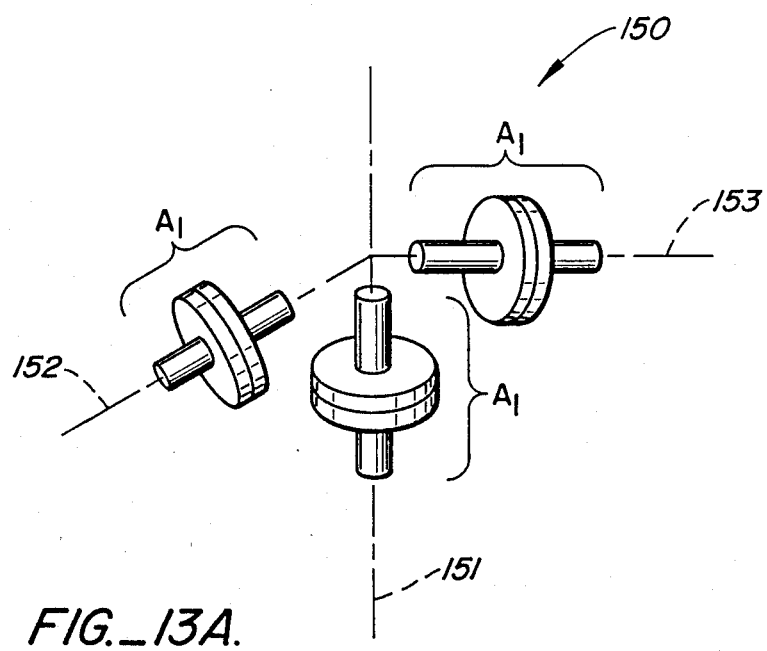
FIG._13A.
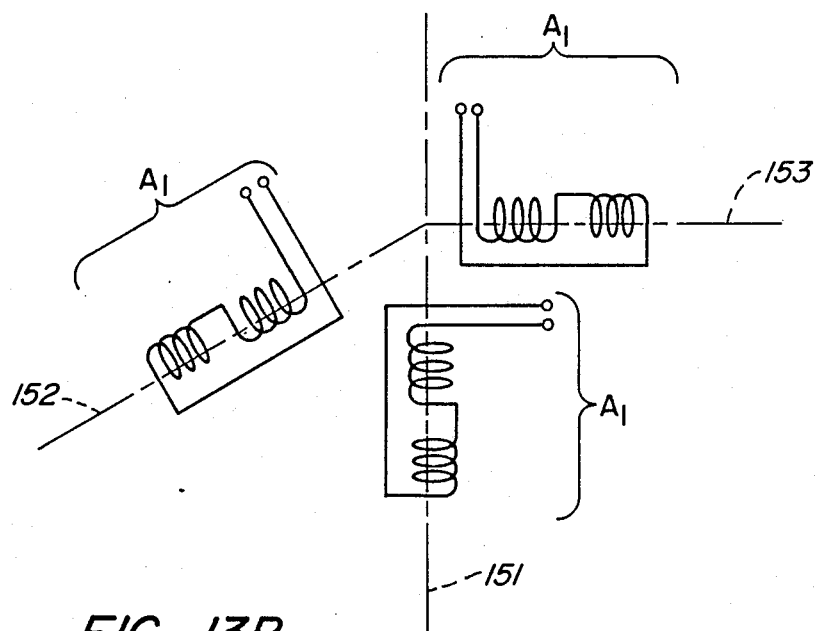
FIG._13B.

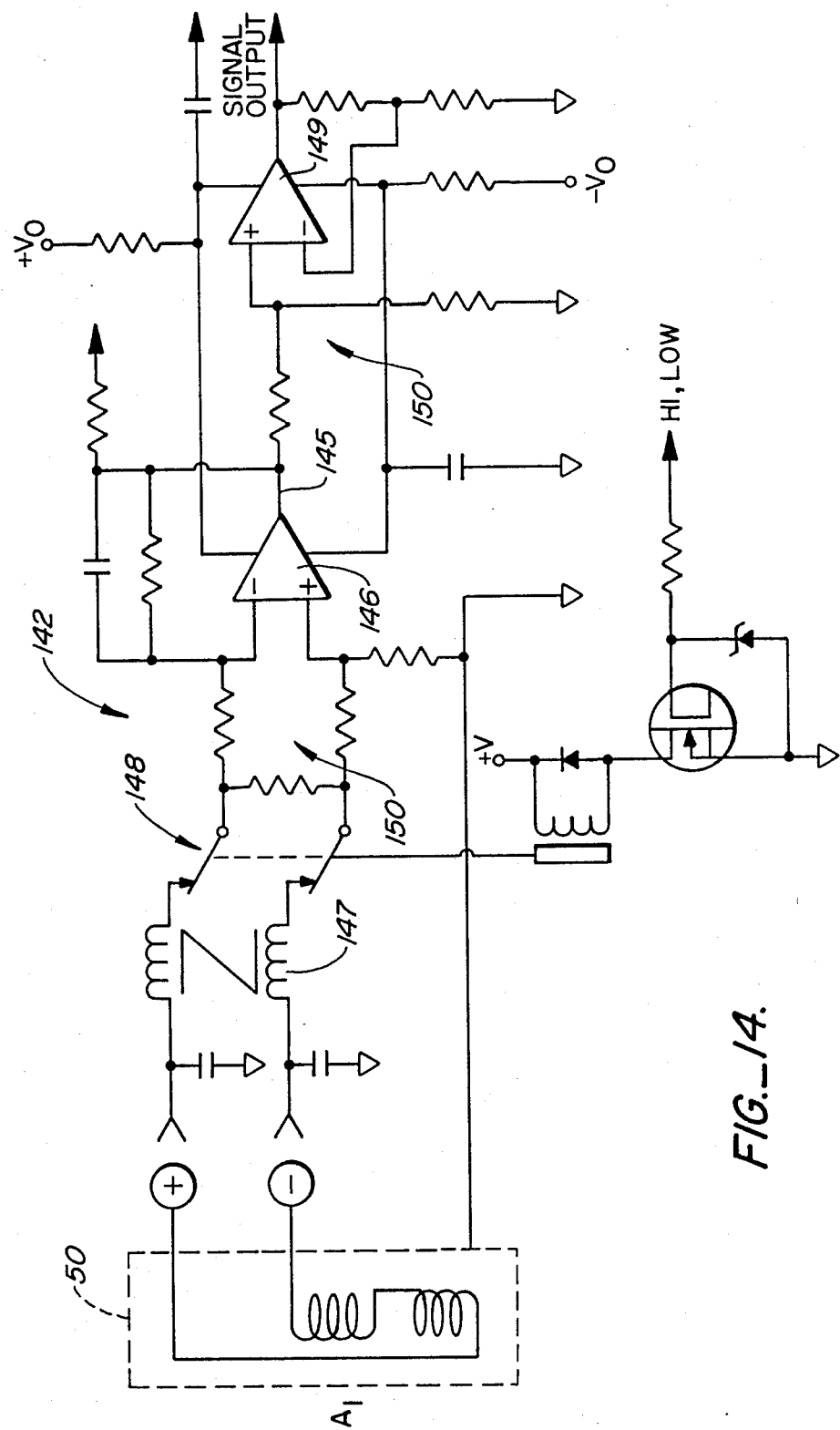
FIG._14.

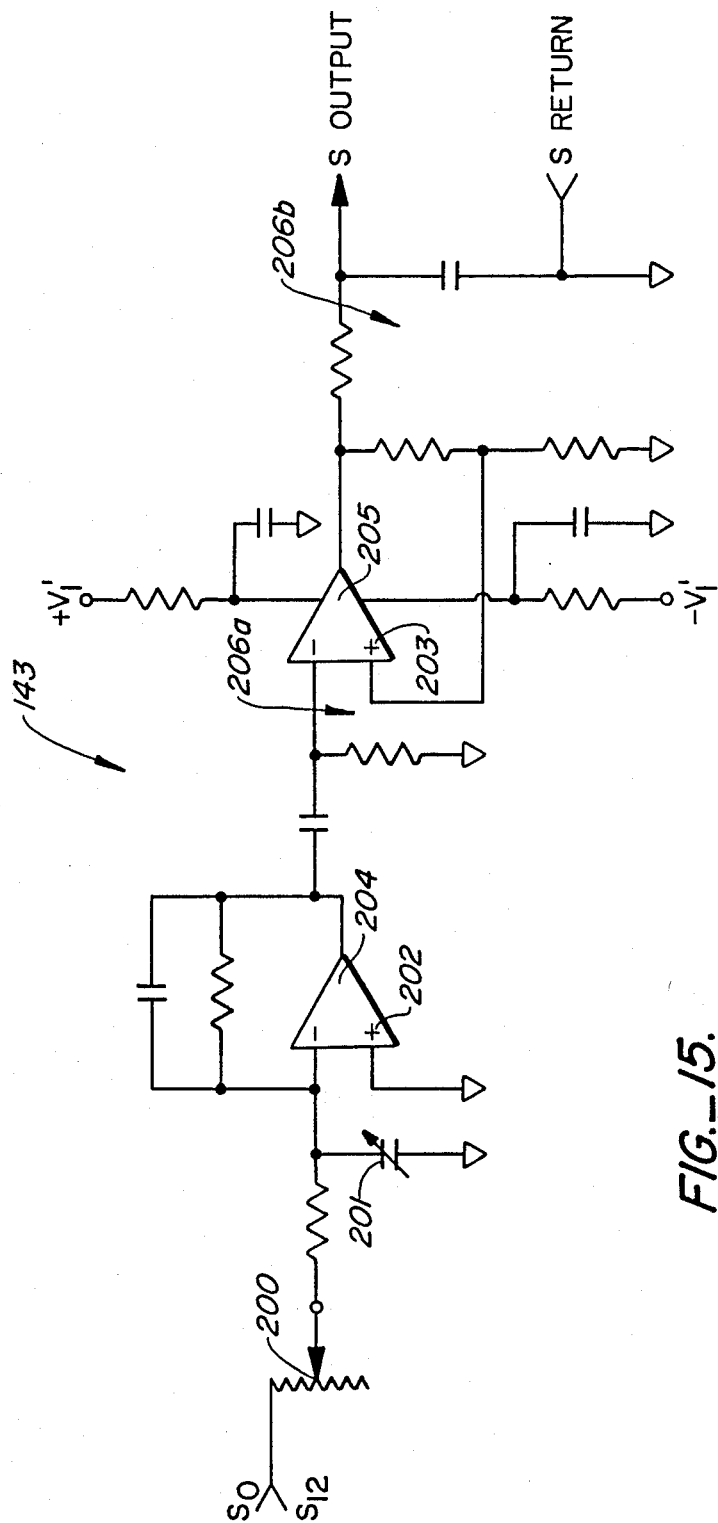
FIG._15.

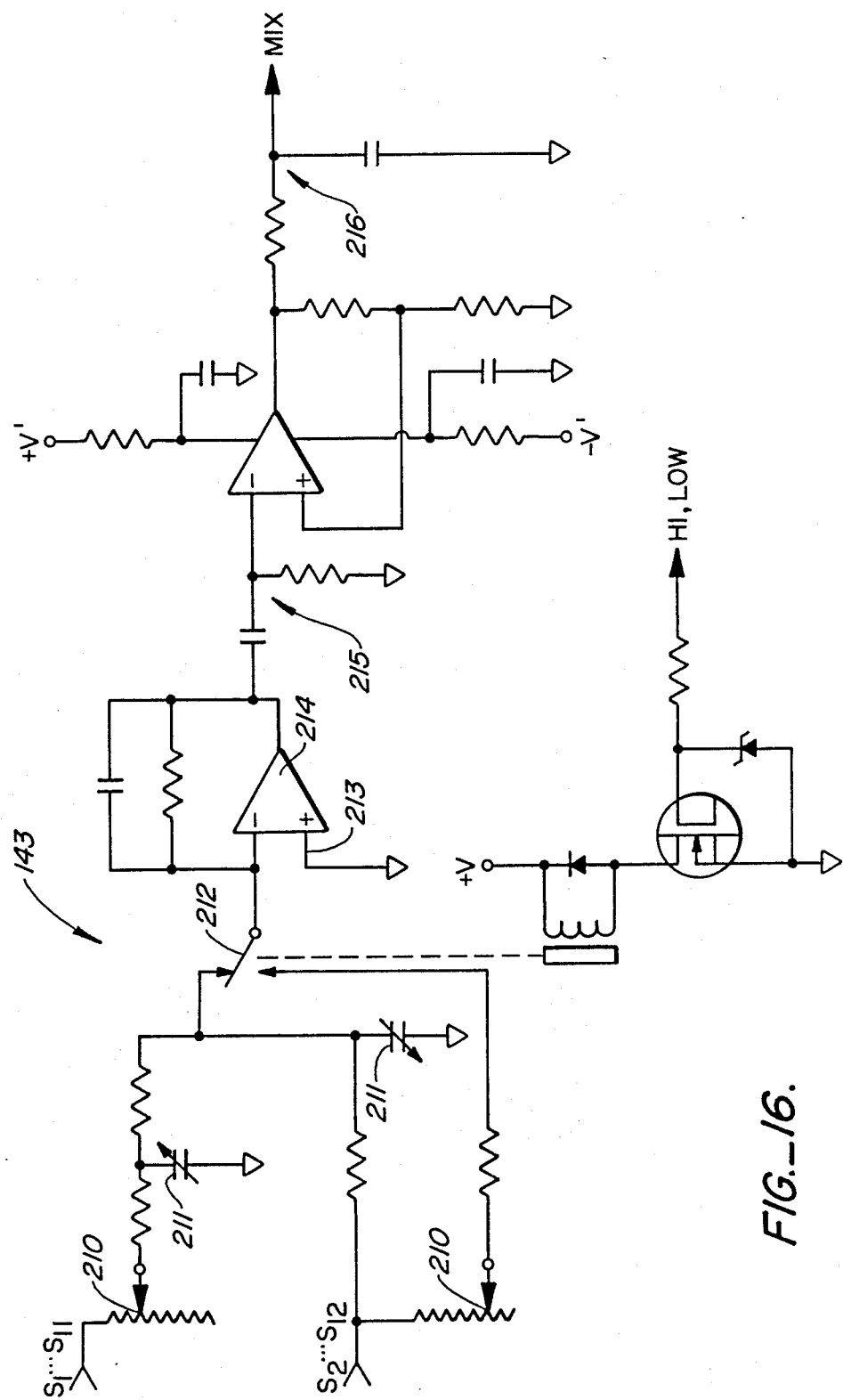
FIG._16.

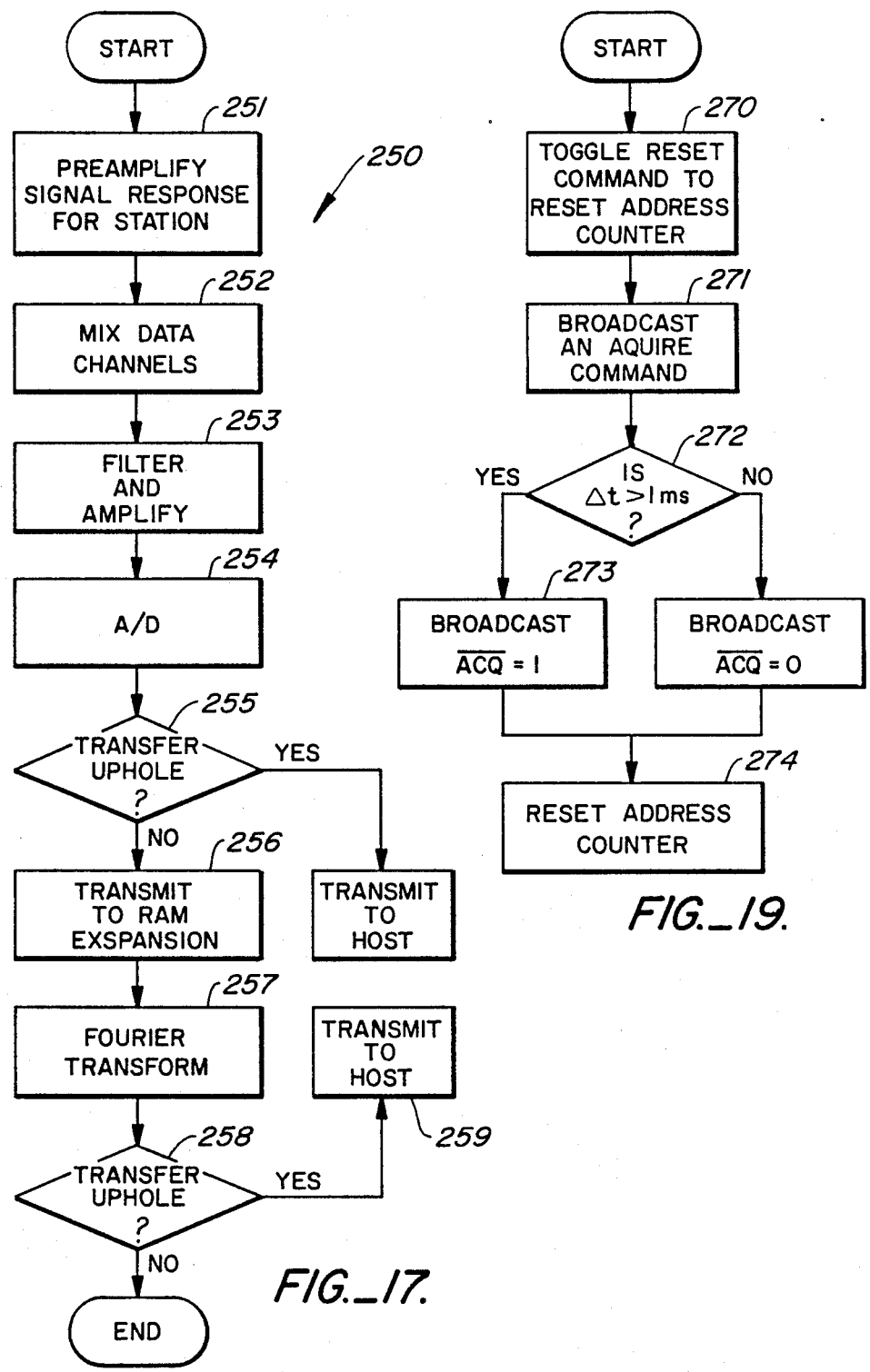

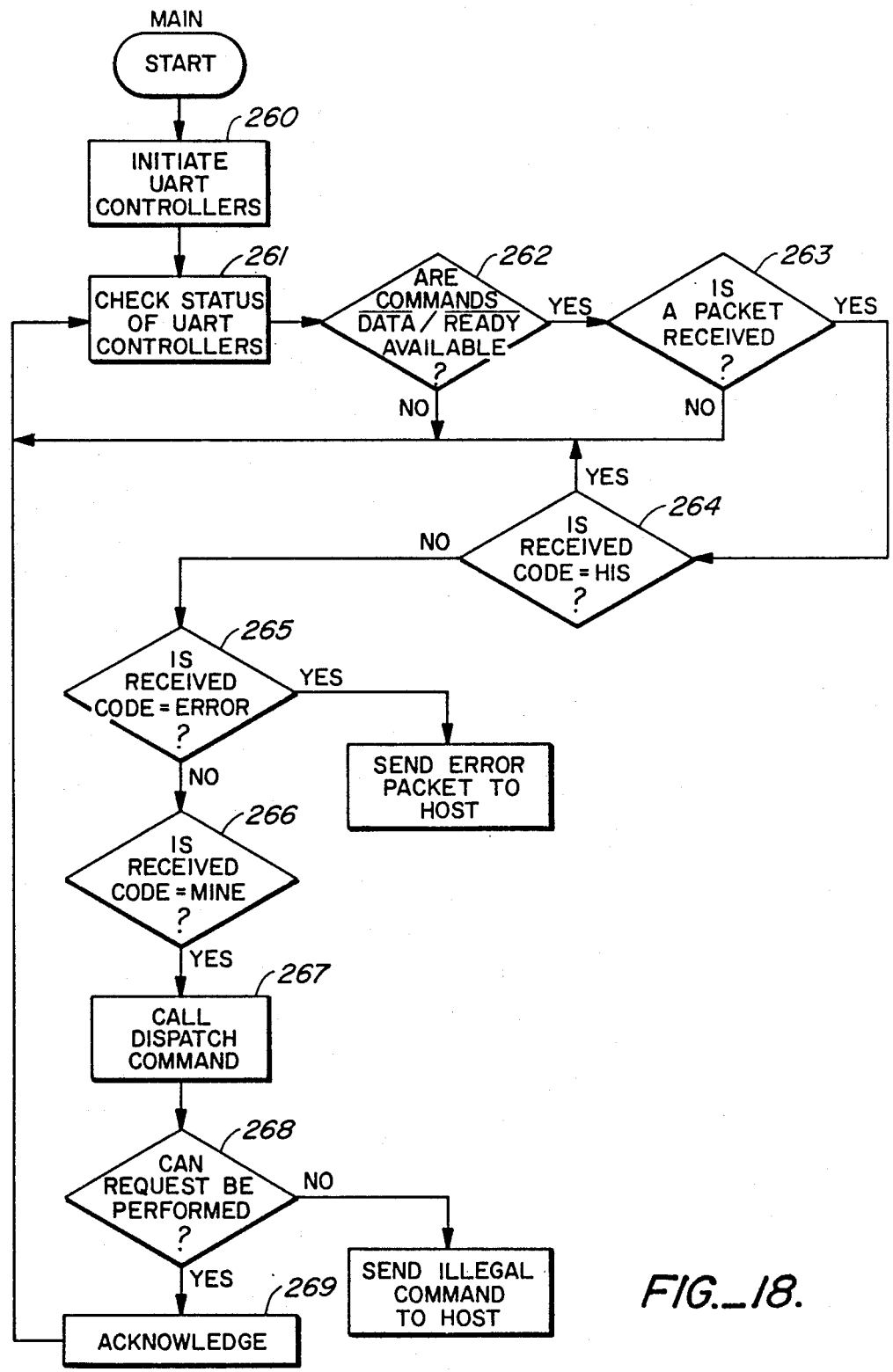
FIG._18.

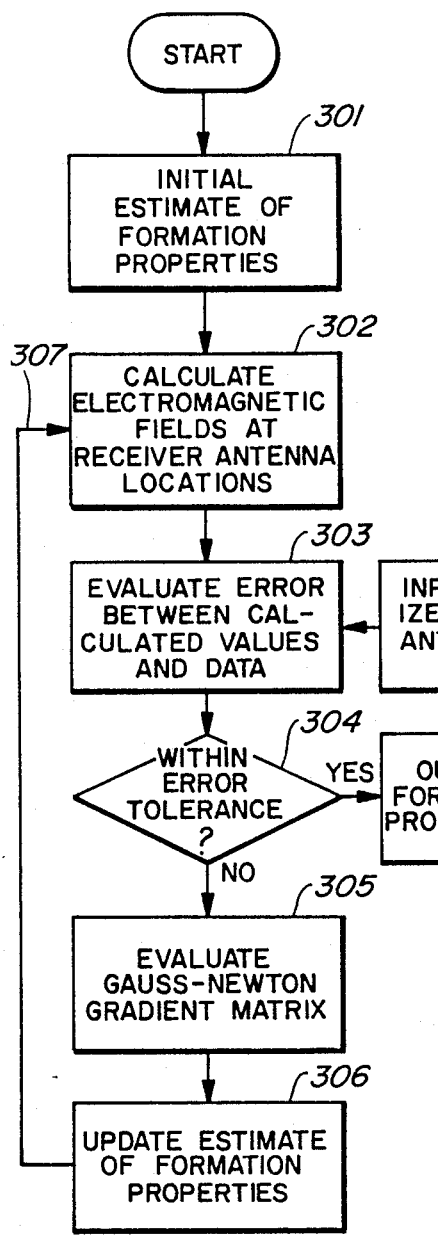
FIG._20.
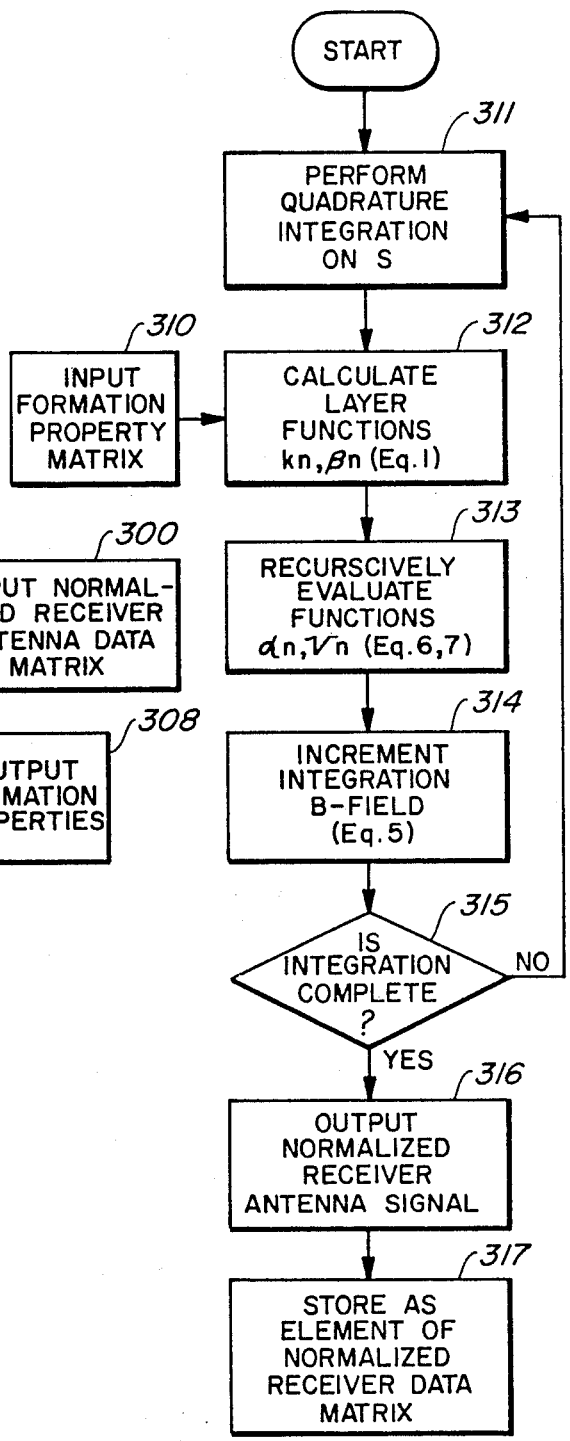
FIG._21.

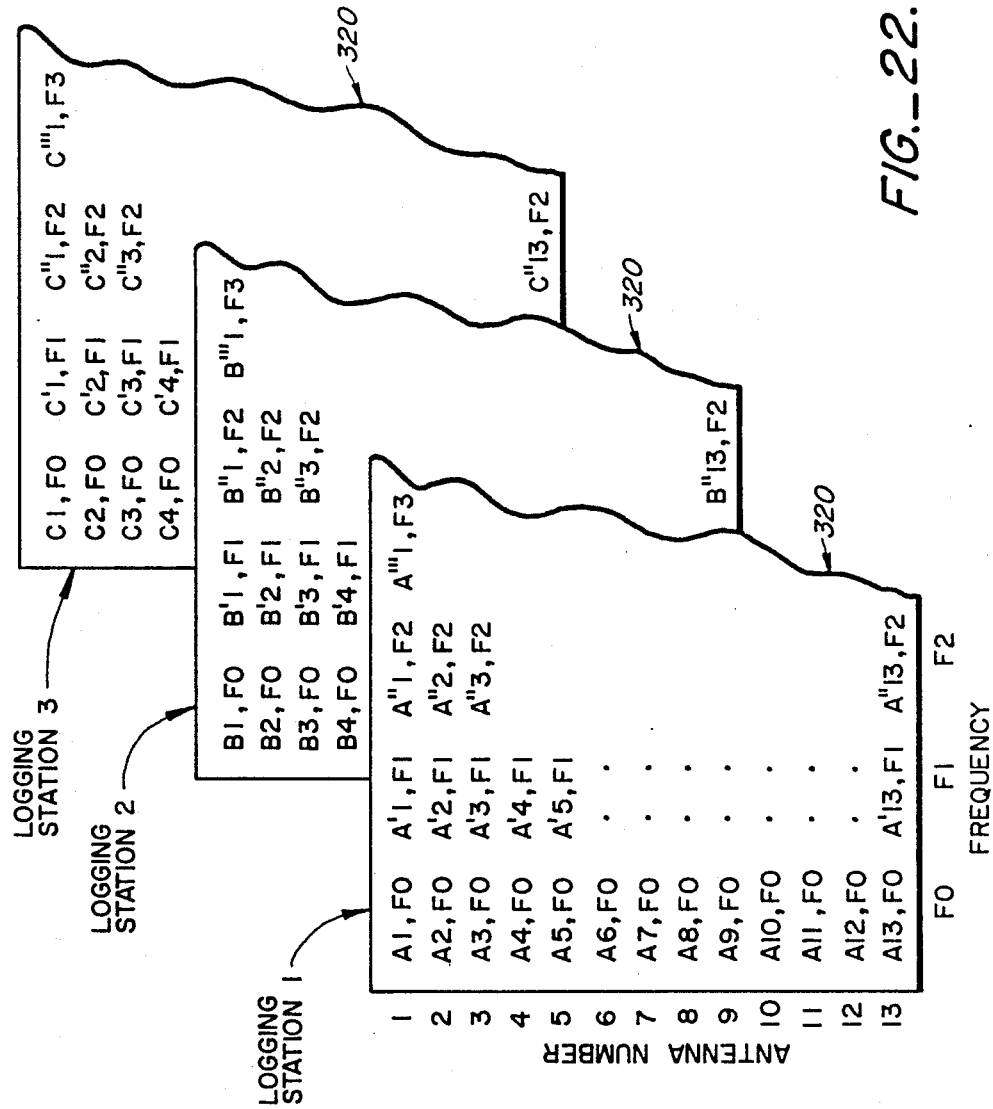
FIG._22.

EXTENDED RANGE, PULSED INDUCTION LOGGING TOOL AND METHOD OF USE

This invention relates to a method and apparatus for investigating an earth formation traversed by a borehole. More particularly the invention relates to an extended range, pulsed induction logging system in which amplitude versus time signals provided by a secondary field within the adjacent formation (after irradiation by a series of powerful, primary pulses of electromagnetic energy) can be detected and processed so that a formation parameter of interest i.e., conductivity and/or dielectric constant, can be accurately indicated.

By the term "pulsed" it is meant that the primary energy comprises a single burst of high level energy at each logging station, although the induction logging sonde may be continuously moving along a borehole penetrating the formation.

BACKGROUND OF THE INVENTION

Induction logging of earth formations from a borehole is an established commercial procedure. In such operations, a constant intensity, magnetic field was generated for propagation into the adjacent formation, by continuously driving a source antenna with an alternating current at a constant frequency and a low steady state power level. A receiver coil assembly was usually electrically balanced to respond to induced eddy currents in the adjacent earth formation. The secondary magnetic field resulting from the eddy currents was then used to generate a voltage signal in the receiver coil assembly. The detected voltage signal varied in accordance with the conductivity of the adjacent formation. Usually, only the component of detected signal voltage that was in-phase with drive current was employed to indicate the formation conductivity or resistivity as an amplitude vs. depth trace.

Various technical papers and publications have discussed the operating principles of induction logging systems as described above. If the proper precautions were undertaken, the continuously detected voltage signal was directly and linearly proportional to the electrical conductivity or resistivity of the logged formation normalized to the range of formation values usually encountered.

Certain operational effects tended to adversely affect the accuracy of the data provided by such prior logging systems, however. One such non-linear effect resulted primarily from mutual interaction of different portions of the eddy currents, a so-called "skin effect", which varied as a function of frequency of operation, the effective length of the source and receiver coil array, and the conductivity of the adjacent formation. Although the occurrence of these objectionable variations could be substantially reduced or eliminated by proper choice of operating frequency and effective coil system length, such restraints limited desirable objectives of the system. For example, to increase the range of the logging system in a lateral direction, the effective system coil length must also be increased. A larger coil spacing, viz., between the source and receiver array, increased the non-linearity of the resulting detected signal due to skin effects.

There have been several methods proposed to correct for the aforementioned skin effect problems. In one such system, a function circuit was used to correct the detected signals in accordance with a predetermined function. In another system, the phase-quadrature signal (said to be approximately equal to the skin effect component of the in-phase detection signal over a given range of conductivity and frequency values), was eliminated.

Another adverse effect also limited the accuracy of results of conventional induction logging systems. This effect related to the fact that (i) the adjacent formation can be heterogeneous, (i.e. a plurality of conducting zones may exist in the adjacent formation other than the true formation conductivity) and (ii) the strata above and below the formation of interest, may effect signal response. Such conditions created substantial errors in the accumulated data using prior art techniques.

Yet another adverse effect arose when the borehole was filled with a drilling mud which formed mud cake along the sidewall of the borehole and permitted a filtrate to invade the formation and form a so-called invaded zone around the borehole. As a result the diameter of the borehole also varied so that the logging sonde was offset different lateral distances from the mud cake as data was taken, introducing yet another adverse data effect.

To overcome the aforementioned adverse effects in part, different arrays and associated circuitry were designed in prior art systems to provide a plurality of different radial logging devices. The separate devices, however, had to be designed so that their operations were independent in attempts to compensate for various adverse effects. For example, individual signals were often compensated for either by tornado charts or by time domain computational methods, such as by the addition of weighting factors. These stored weighting factors combined in such a way that the effect of regions other than the region under consideration, were diminished.

While prior art alternating current induction logging systems were effective, their utility was greatly restricted by their limited lateral range, their limited vertical resolution, their limited accuracy in determining true formation conductivity, and their inability to determine dip angle of beds or the range and azimuth of formation anomalies.

Accordingly it is the principal object of this invention to provide a new and improved induction logging method and apparatus whereby logs of greatly improved accuracy, range, resolution, and reliability may be obtained.

SUMMARY OF THE INVENTION

In accordance with the present invention, a pulsed induction logging system is provided which includes a logging sonde for traversing a borehole and having downhole microprocessor/controller circuitry in operative contact with a separate host computer/controller at the earth's surface. The host computer/controller and the downhole microprocessor/controller constitute a network of digital computers and generate a pulsed logging code (ON-OFF) for periodically permitting a radiation coil to be driven by a short burst of current having high peak power. Thus, a powerful primary pulse of electromagnetic (EM) energy (typically 50 megawatts) is periodically generated which is irradiated into the adjacent formation for induction logging purposes. These high energy pulses are initiated at periodic intervals and thus at predetermined distances between logging stations as the sonde is raised continuously in a borehole.

In addition to a power circuit for generating the primary pulse field, the sonde also includes an antenna array for detecting secondary induced fields in the formation. The array preferably includes a series of grouped, paired coils axially spaced along the borehole. Each group of paired coils independently detects the secondary field. Thereafter each detected signal per group of paired coils is digitized, reformatted and transmitted to the host computer/controller at the earth's surface. The serially transmitted digital data is highly accurate and is capable of frequency domain transformation in situ, and after additional processing in the frequency domain, final displays provide accurate indications of formation conductivity and/or dielectric values irrespective of formation-borehole non-linear effects and azimuthal and dip direction of the formation.

In accordance with method aspects of the present invention, the final displays result from (1) modeling the logged formation at each logging station using a series of assumed conductivity values and bed thickness (along with the actual parameters of pulsed primary field), and (2) then cross-checking the forward solution of the model against the digital field data actually detected by the logging system. Operations stop when convergence occurs. In the steps (1) and (2), amplitude v. time representations of the detected signals are transformed to depth/amplitude-frequency domain values. The resulting matrix can undergo additional processing involving "frequency slicing", i.e. obtaining "frequency slices" of the matrix centered at a particular frequency, to yield accurate indications of resistivity and dieletric values of the formation. Thus bed, dip and azimuthal resolution can be divorced from the ranging requirements of conventional tools.

It should be noted that "frequency slices" concentrated on low frequencies. say 10–20 kilohertz yield accurate conductivity values; at higher frequencies, between 1–10 megahertz, true dielectric values are indicated.

Other objects, advantages and features of the invention will become apparent from the following detailed description thereof presented in conjunction with the accompanying drawing.

BRIEF DESCRIPTION OF THE DRAWINGS

FIG. 1 is a partial sectional view of a borehole penetrating an earth formation illustrating operations of a pulsed induction logging system in accordance with the present invention.

FIG. 2 is a side elevation of the logging sonde of FIG. 1;

FIG. 2A is a detail in side elevation of a radiation coil for generating a pulsed primary magnetic field of extremely high power level.

FIG. 2B is a detail in elevation of an antenna array within the sonde of FIG. 2.

FIGS. 3A, 3C–3G are a series of waveforms illustrating various operating characteristics of the present invention.

FIG. 4 is a time v. depth display illustrating pulsed logging operations in detail.

FIG. 5 is a circuit diagram in block form of control and primary field generating circuitry elements for generating the primary pulse of electromagnetic energy in accordance with the invention.

FIG. 6 is a further block diagram of the field generating current elements of FIG. 5 including a L-R-C power circuit.

FIG. 7 is a flow diagram of operation of the circuit block diagrams of FIGS. 5 and 6.

FIG. 8 is a circuit diagram of the L-R-C power circuit of FIG. 6.

FIG. 9 is a side elevation of a plasma generator for generating the pulse primary field of the invention as an alternate embodiment therefor.

FIG. 10 is a circuit equivalent of the plasma generator of FIG. 9 illustrating additional charging/discharging circuitry.

FIGS. 11A and 11B are waveforms of the primary wave generated by the circuit of FIG. 10.

FIG. 12 is a circuit diagram in block form of control and secondary circuit detection elements including paired coil antenna groups for detecting the induced secondary field in an adjacent earth formation.

FIGS. 13A and 13B illustrate a modification of the paired coiled antenna group of FIG. 12 to form a 3-component antenna group.

FIG. 14 is a preamplification circuit used by and forming a part of the circuit of FIG. 12.

FIGS. 15 and 16 are elements of a mixing circuit used by the circuit of and forming a part of FIG. 12.

FIG. 17 is a flow chart of steps related to detection of the secondary induced field in the logged earth formation.

FIG. 18 is a flow chart illustrating digital control steps for initializing and identifying command codes downhole.

FIG. 19 is a flow diagram of A/D conversion.

FIGS. 20 and 21 are flow charts of previous steps for enhancing signals so as to provide improved results.

FIG. 22 is a matrix display of results in accordance with the present invention.

DETAILED DESCRIPTION OF THE INVENTION

In broad terms, the present invention, as shown diagrammatically in FIG. 1, comprises a pulsed induction logging system 10 for investigating an earth formation 11 using a series of periodic pulses 12 of electromagnetic (EM) energy as the primary magnetic field for induction logging purposes By the term "pulsed" as previously indicated, it is meant that the primary field pulses 12 being irradiated into formation 11 are discontinuous with time but their energy level per pulse interval is substantially constant. Moreover, although the movement of sonde 14 along borehole 15 may or may not be continuous, there must be movement from at least one logging station indicated in solid line at 16 to at least another logging station indicated in phantom line at 17, at which time a second pulse 12 of primary energy is generated. Thus, the pulse generation occurring at the stations 16 and 17 in conjunction with movement of the sonde, defines a pulsing sequence (ON-OFF) in which OFF time (between two adjacent ON pulses 12 coincident with stations 16 and 17), must be longer than the width (time) of the pulses 12 themselves.

Sonde 14 is initially lowered into the borehole 15 and then is raised by reeling cable 19 over pulley 22 via winch 20 at the earth's surface 21. Slip rings 23 electrically connect power supply 24 to the logging sonde 14. Logging depth is indicated by encoder 25 to generate digital pulses for recorder 26.

As the sonde 14 moves relative to the borehole 15, the high peak power EM pulses 12 are generated via a digital logging code generated at host computer/controller 27 at the earth's surface and received at a downhole microprocessor/controller 28 in the sonde 14. The downhole microprocessor/controller controls a power circuit (not shown) which is selectively enabled so as to trigger the periodic pulses 12 via source radiation coil system 29. Each pulse 12 induces a secondary field in the formation 11, such induced signals then being detected by an antenna array 30 within the sonde 14. After being digitized and reformatted via a second downhole microprocessor/controller (not shown), the detected signals are transmitted uphole to the host computer/controller 27. Since the sonde 14 has important system responsibilities, a detailed description of its construction and operation is presented below in conjunction with FIG. 2.

Construction of Sonde 14

As shown, the sonde 14 is divided into a command section 35 supported at a upper end 36 by cable 19. Connected at an opposite lower end 38 of the command section 35, is a radiation section 40. The radiation section is of similar diameter as command section 35 and they are mechanically coupled by a collar 41A. As shown, radiation section 40 in turn is coupled to a spacer section 44 which in turn is coupled to a receiver antenna section 45 by similar coupling collars 41B and 41C, respectively. In turn, receiver antenna section 45 is coupled in similar fashion by collar 41d to a conventional directional instrument section 46 containing sets of magnetometers and accelerometers that result in the generation of a directional output for transfer uphole. Such section 46 is a product of Tensor Incorporated, Austin, Tex.

In forming the radiation and antenna sections 40, 45, care is taken to form them of non-magnetic material, while spacer section 44 is formed from material of sufficient strength to withstand operational stress without undue increases in weight, such as fiberglass. Within the radiation section 40 is a single inductive radiation source coil 50, also shown in detail in FIG. 2A.

Inductive Coil 50

In FIG. 2A, note that the purpose of inductive coil 50 is to receive a powerful pulse of amplitude-varying current to generate a corresponding powerful pulse of primary electromagnetic energy.

The magnetic energy associated with current in the radiator coil 50 can be characterized as a magnetic dipole (strength equal to the product of current, cross sectional area, and number of turns in the coil 50). As a result, enormous transient pulses can be generated because the limitations of coil heating and a large continuous power supply are not present. Power is simply generated by the discharge of stored energy, which may be in electrical or in chemical form.

Thus, the coil 50 must be electromagnetically able to withstand large current pulses needed to produce the intense electromagnetic field of the present invention. Consequently, the turns 51 of the coil 15 wound about a central mandrel 52 must be large in cross section to provide sufficient surface area for this requirement. Headers 53 complete the mechanical construction. FIG. 2A shows the radiation antenna coil 50 polarized in the vertical direction: that is, generating a magnetic field directed along the axis of the tool and borehole. The antenna coil 50 may also be oriented in a horizontal direction, if desired.

Antenna array 54 within the antenna array section 45 is a series of axially spaced receiving coils generally indicated at 54 as an antenna array and shown in detail in FIG. 2B. As shown, pairs of receiving coils 54 over a central region 55 each forms a single antenna group $A_1, A_2 \ldots A_{12}$. These groups $A_1 \ldots A_{12}$ are comprised of two inductive pickup coils 56, 57 wound in opposition about mandrel 58 so as to cancel out the common mode of the induced signal. The signals from adjacent antenna groups are mixed electronically so that the digitized signal represents the second derivative or curvature of the magnetic field. Coils 59 at the end of the array together form a similar antenna group $A_{13}$. In each group (wound in opposite direction) the number of turns is inversely proportional to the cube of the distance of the group $A_1$–$A_{13}$ relative to the mid-point of the source coil 50 of FIG. 2A to facilitate the first differencing. The number of antennas groups is limited only by the available power to run the tool electronics, pulse power supply, and motors.

Principles of Signal Detection

The information on the distribution of the resistivity in the layered formation is contained in the curvature of the magnetic field. For high spatial resolution applications, this information is typically 80 to 120 dB down from the peak magnetic field measured at each group location. Because available electronic amplifiers have a dynamic range of about 100 to 110 dB, the signal must be differenced by the opposing coil method to avoid exceeding the dynamic range limitation of the front end amplifiers.

As further indicated, each group $A_1 \ldots A_{12}$ is axially spaced from adjacent neighboring group by a constant distance D. In detecting induced secondary fields within the adjacent formation, the present invention requires very high precision measurements of the magnetic fields by the antenna array 54. As previously indicated, information characterizing the formation is at levels from 80 dB to 120 dB down in the measured signal. Once in digital form, however the data can be accurately processed and transmitted up the wireline with no further degradation in quality. If the data were not digitized in the tool, the signals would be degraded by transmission losses and the information would be irretrievably lost.

In this regard, signal acquisition is defined in this application as the process of acquiring a signal by the array 54, amplifying it, mixing the signal with other signals, digitizing and storing the combination in an on-board memory before transference uphole to the host computer/controller.

Data Acquisition

As previously indicated, pulse generation and data acquisition is carried out in a systematic manner as the sonde transverses the borehole using a host computer/controller at the earth's surface in conjunction with two on-board microprocessor/controllers. Together, they form a computer network that creates a logging (command) ON/OFF pulse code, a part of which is shown at 76 (FIG. 4) that systematically controls logging operations.

Logging Code

As shown in FIG. 4, adjacent logging station 1 and 2 are preferably overlapping. Each of the antenna groups $A_1 \ldots A_{13}$ together with radiation coil 50 normalized to axial lengths $L_1$, $L_2$ provides for a series of overlapping magnetic field measurements at each logging station. In that way, lateral range requirement (known to be a function of the spacing $L_e$ between radiation coil 50 and antenna array 54) can be decoupled from the system logging requirement since incremental vertical response of the formation (adjacent each antenna group $A_2 \ldots A_{13}$) is directly related to the distance between each antenna group $A_1 \ldots A_{13}$ relative to radiation coil 50.

For conductivity values usually encountered in logging operations, assuming an operating frequency of about 7500 Hertz, an antenna spacing of 1 meter and an average coil spacing $L_e$ (See FIG. 2) of 8 meters, experience indicates the maximum lateral range of the tool or sonde is about 100 meters with a vertical layer resolution of about 1 meter. For an operating frequency of 15 kHz, an antenna spacing of 8 inches and an average coil spacing $L_e$ (See FIG. 2) of 3 meters, experience indicates the maximum lateral range of the tool is about 15 meters with a vertical layer resolution of about 8 inches.

As shown in FIG. 4, operations associated with pulsing, detection, amplification and digitization steps define a constant logging interval 77 that is long compared to pulse interval 78 but much less than the idle interval 76. The pulse width of pulses 77 is so small compared to the other operations requirements, e.g., to transmitting the data uphole that the duty factor for operation is very small, i.e., 0.0001 or less. Additionally, sufficient time is available for digitizing the detected signals between logging stations using one of the more downhole controller/microprocessors. Also the pulse interval must be short enough that the upward motion of the sonde is negligible.

The velocity of the sonde during a logging run is between 10–30 feet per second. The pulse logging code 76 defined by such a run is not normalized to sonde speed but is made to depend on logging station depth. Depth (or logging station location) is constantly and accurately monitored by the host computer controller 27 (FIG. 1) at the earth's surface 21 through the depth encoder 25. Since the depth of each logging station along the entire run can be predetermined and such data placed in memory of the host computer/controller 27, firing commands for the sonde via the logging code 76 is automatically generated.

Waveform Characteristics

FIGS. 3A and 3C illustrates the nature of primary electromagnetic field in more detail. In these waveform diagrams the horizontal axis is time normalized to a pulse interval used in the induction logging procedure while the vertical axes represent various electrical quantities.

FIG. 3A illustrates the general character of the exciting drive current and drive voltage for the source coil.

At the time $t_o$, the drive voltage instantaneously changes from 0 to V-cap and the current waveform 61 begins to undergo change in accordance with the depicted damped oscillation, lagging behind the voltage waveform 62 as shown. The result is that a high intensity, time-varying magnetic field 65 of FIG. 3C is generated. Its relatively high peaks 66 result in a pulse waveform of relatively high power content substantially above the ambient noise level. Abrupt steepness in the shape of its waveform is also noteworthy. Such characteristics aids in the generation of a full-range of frequency components. Induced magnetic fields finally detected by the antenna array have similar frequency characteristics and such signals can be related to a formation parameter of interest (e.g., conductivity, resistivity or dielectric constant).

As well understood by those skilled in the art, the field 65 of FIG. 3C has the same amplitude variation as the current waveform 61 of FIG. 3A. As is well known, the magnetic field 65 will create a primary field of magnetic induction B having a time variation in field strength which corresponds to that of the H field. In the absence of eddy currents, the only inductive field will be the source inductive field created by the primary magnetic field 65. Therefore the voltage induced in the receiver antenna array would be in accordance with the rate of change with time of the strength of that field.

Bed Response

FIGS. 3D, 3E, and 3F illustrate how field 65 responds in different environments.

In this regard, note that the secondary inductive field induces a voltage signal in the receiver coil assembly that varies in accordance with the conductivity of the adjacent formation. Since such component is in-phase with drive current waveform 61 FIG. 3A, its change vis-a-vis the primary induced field is directly indicative of formation conductively or resistivity.

As shown in the FIGS. 3D, 3E and 3F, eddy currents substantially affect the peak values 69 of the detected signal waveforms 71, 72 and 73 associated with high, intermediate and low resistivity formations. Since the flow of such eddy currents create a secondary inductive field that opposes the primary currents, the high conductivity environments create the largest secondary inductive field to oppose the primary inductive field. Such a secondary field will act upon each antenna group and induce therein a component of voltage having a waveform correspondence to the voltage waveform 62 of FIG. 3A.

Source Field Generation

FIGS. 5–11 illustrate circuitry for generation of the high-intensity primary pulse magnetic field for logging purposes.

As shown in FIG. 5, host computer/controller 27 is connected to a downhole controller/microprocessor 80 via power/data bus 79 and thence to power source/switching network 81. Prior to discharge, L-R-C circuit network 82 must have been energized by low power trickle charging current using downhole power supplies 83 under control of controller network 84. Power bus 85, as shown, is used to provide the electrical power path through downhole controller/microprocessor 80 and thence to the source/switching network 82. Control signals pass between the same circuits but use the data bus generally indicated at 86. The data bus 86 is under control of controller 87, via microprocessor 88 and memory 89. A feedback loop 90 that includes flux measuring coil 91 about radiation coil 50, provides an identification of the amplitude vs. time waveform of the magnetic field at the coil 50. A potential difference between a surface electrode and a conventional sonde electrode, is indicated at spontaneous potential measuring circuit 92.

Controller 84

FIG. 6 illustrates controller 84 of power source/switching network 81 in more detail.

As shown, the purpose of controller network 84 is to provide for monitoring of high and low voltage supplies 93, 94. A regulator 95, a voltage monitor 96 and timer 97 in conjunction with A/D convertors (not shown) within voltage monitor 96 and flux monitor 98, are used.

Flux monitor 98 comprises a passive RC integrator connected to a A/D convertor (not shown) within monitor 96. Thus a voltage proportional to flux is digitized for control purposes. Regulation 95 includes a voltage attenuation circuit in series with an operational amplifier. As unbalanced condition occurs, the operational amplifier output is converted to a digital signal at the A/D converter. Similarly, voltage monitor 96 includes a attenuation circuit that monitors the voltage output of supply 93 via the same A/D convert and thence provides a signal to the microprocessor/controller 80 of FIG. 5. Timing circuit 97 includes a counter controlling a switch as explained below to better shape the primary field waveform.

Microprocessor Interaction

Interaction of the operations of the controller/microprocessor 80 of FIG. 5 with controller 84 of FIG. 6 is instructive and can be best illustrated with reference to flowchart 100 of FIG. 7.

Assume that a logging station is at hand. A reset command is first generated at 101 within controller/microprocessor 80 after which a load switch enable time is loaded into a register (not shown) as indicated at step 102 of FIG. 7. Thereafter, there is a loading of a delay interval time within another register as indicated at 103. After loading the desired breakdown voltage level into yet another register as indicated at 104, the d.c. supply means are energized as indicated at 105 and then the voltage is monitored and tested at 106, 107, and 108 after which an acquire command and a rest command is issued at 109 and 110, respectively.

In order to cross-check the nature of testing commands at 106, 107 and 108, the voltage levels are determined at the regulator 95, voltage monitor 96 and timer 97 of controller 84 of FIG. 7 as previously indicated and then the results communicated uphole to the command controller/microprocessor 80. Their purpose is to control the shape, amplitude and duration of the radiated pulse at the source coil 50 of FIG. 5 after enabling L-R-C power circuit 112.

L-R-C Power Circuit

FIG. 8 illustrates L-R-C power circuit 112 in more detail.

Its purpose is to permit accumulation of charge at a low power level, 50 watts for a selected time interval, then discharge the charge through the radiation coil 50 over a very short time, e.g., 60 microseconds. Peak power can be at a level of about 100 megawatts with 50 megawatts being typical. That is to say, the present invention delivers extremely high peak power levels at moderate average power by operating at a very low duty cycle; pulse discharge time is very much faster than pulse charge time.

In more detail, L-R-C circuit 112 comprises a charging circuit 113 whereby energy storage capacitors 114 are charged to a predetermined voltage. The circuit 112 also includes discharge circuit 111 through which the energy in the capacitors is rapidly discharged, creating a high intensity transient current in the radiation coil 50. Initially switches 115, 116 and 117 are open. On digital command, switch 115 in the charging circuit is closed and capacitor 114 are charged by a standard high voltage charging supply 118. When a predetermined charging voltage on the capacitors 114 is attained, say 5000 volts, switch 115 is opened and the pulsed power supply is ready for firing. Upon the firing command from the host computer/controller 27 at the earth's surface, switch 116 is closed. The energy from the capacitors 114 discharges through the main discharge circuit 111 which consists of the capacitors 114 the inductive radiator coil 50 and various parasitic resistances and inductances associated with these elements.

The discharge is characteristic of an L-R-C circuit as shown in FIG. 3A. If the parasitic resistances are small, the current waveform oscillates and decays slowly. This has the advantage of concentrating the radiated energy around the fundamental frequency of the oscillations. The spectrum of such a discharge is shown in FIG. 3G, peaking at 15 kHz.

The discharge waveform can be terminated at any desired time to change the frequency spectrum of the discharge current. This may be desirable to broaden the frequencies available for analysis. Terminating the discharge pulse is accomplished by closing switch 117 at the appropriate time. This diverts the current in the discharge circuit 114 through a large power resistor 120 which rapidly absorbs energy and damps the current waveform.

PPMHD Source 122

18 FIGS. 9-11 illustrate an alternative pulse power source for L-R-C power circuit 112 of FIG. 8 and comprises a pulsed plasma magnetohydrodynamics (PPMHD) source 122.

The advantage of a pulsed plasma magnetohydrodynamics (PPMHD) source 122 is that the major fraction of the discharge circuit energy is obtained from the chemical energy of an explosive cartridge. In practical well logging devices, electrical power is limited to a few hundred watts, most of which is required to run the various electronics and motors associated with the tool. On the other hand the MHD source 122 requires only a small portion of electrical energy but still can emit an extremely powerful pulse of EM energy and is best used for ultra-extended range applications with limited resolution and minimal requirements on the number of pulses per logging run. Ten to thirty kilojoules can be discharged, for example, in a few tens of microseconds into the radiator coil, leading to peak power levels from 500 to 5000 million watts. See U.S. Pat. No. 3,878,409 for "Explosively Driven Electric Power Generation System", incorporated herein by reference.

In operation, source 122 is activated by detonation. As shown in FIG. 9, chemical explosive 126 and an argon gas in space 127 explode. The gas becomes ionized and flows at high velocity into channel 128. The plasma flowing through a magnetic field generated by coils 124 produces power at electrodes 129 connected to a source coil (not shown).

Ignition

FIG. 10 illustrates the ignition process.

As shown, a small auxiliary capacitor charge-discharge circuit 130 creates the magnetic field for the source 122. A small energy storage capacitor 123, is charged and upon the firing command, is discharged through a field coil 132 surrounding the MHD (magnetohydrodynamic) source 122. When the current in this auxiliary field coil reaches a maximum, the cartridge 123 is detonated and drives the highly conductive plasma at high velocity as previously indicated. The plasma moving at high velocity across the applied magnetic field, develops a powerful electrical output via a Faraday MHD process. This output current pulse is either transformed to a lower current at higher voltage or fed directly to the radiator coil to produce the magnetic dipole.

With switch 133 open, switch 134 is closed to charge the small capacitor 131. When the capacitor 131 is charged, switch 134 is opened. Upon receiving the firing command, switch 133 is closed and the capacitor 131 discharges through time field coil 132. When the field coil current reaches a maximum, the explosive cartridge 123 is fired and the MHD source begins to generate current. The MHD source switches on when the pulse of plasma arrives at the electrodes which are bathed in the applied magnetic field.

A typical current pulse 135 is shown in FIG. 11A. The corresponding frequency spectrum 136 is shown in FIG. 11B. This type of pulse produces a broad band frequency spectrum. Because of the large amplitude of the current pulse, the spectral energy densities are high and useable over a range from a few hundred Hertz to 50 kilohertz.

Antenna Array Operation

FIGS. 12-19 illustrate circuitry for detecting amplitude v. time of the induced signals using downhole controller/microprocessor 140 in conjunction with uphole host computer/controller 27.

The purpose of the circuitry in FIGS. 12-19 is to relate signal response of each of antenna group $A_1 \ldots A_{13}$ of FIGS. 2 and 2B and thereby obtain a series of overlapping magnetic field measurements. In that way, lateral range requirement (known to be a function of distance between the source coil and antenna group $A_1 \ldots A_{13}$) can be decoupled from system logging requirements. It should be further noted that all operations are paced by digital control signals interacting between the host computer/controller 27 at the earth's surface and downhole controller/microprocessor 140 of FIG. 12.

Controller/Microprocessor 140

FIG. 12 illustrates controller/microprocessor 140 in more detail.

As shown, the controller/microprocessor 140 is connected to host computer/controller 27 via power data bus 141 and includes a controller 142. The controller 142 controls pre-amplification network 142, mixer network 143, A/D convertor circuit 144 and microprocessor 145 to detect and digitize inducted signals at the antenna array 146.

FIGS. 13A-13B illustrate how a pair of receiving coils comprising a single antenna group $A_1$-$A_{13}$ of FIG. 2B can be formed into a three component array 150 wherein group $A_1$ is multiplied by three so each pair has an axis of response 151, 152 or 153 orthogonal to the two remainder axes.

Pre-Amplification Circuit 141

FIG. 14 illustrates pre-amplification circuit 142 in detail.

As shown, incremental difference signal responses from an antenna group $A_1$ are identified at the output 145 of amplifier 146 after the signals have passed through blocking transformer 147 an switches 148. After amplification at amplifier 147, the difference signal passes to mixer circuit 143.

The circuit 142 is designed for low noise, high common-mode rejection and provides a high gain bandwidth product to minimize temperature effects. Compensating attenuator networks 150 before and after amplifier 146, are used to adjust the levels of neighboring antennas to achieve good differencing of the mixed signals.

The second amplifier 149 is used to boost the signal so that further electronic amplification, attenuation, or mixing does not degrade the signal-to-noise ratio (SNR). The SNR of each antenna is established prior to the second stage of amplification at amplifier 149 and is the highest SNR possible.

Mixer Circuit 143

FIGS. 15 and 16 illustrate mixer circuit 143 in detail.

As shown in FIG. 15, direct signals from the end antennas group $A_{13}$ of FIG. 2B are first gain and phase nulled via appropriate change in the values of variable resistor 200 and capacitor 201. In that way, response of the antennas can be easily calibrated. Signal level control at non-inverted inputs 202, 203 of amplifiers 204, 205, respectively, add additional range to the calibration process. Filters 205 and 206 at the input and at the output of amplifier 205 rid the signal of unwanted low and high frequency components as generated by the tool d.c. power supply and the L-R-C circuit.

As shown in FIG. 16, mixed signals from antenna group $A_1 \ldots A_{12}$ are similarly gain and phase nulled via appropriate change in the values of variable resistors 210 and capacitors 211. After passing through switch board 212, additional range to the calibration process is provided by having a normalization signal level appear only at the non-inverted input 213 of amplifier 214. Filters 215 and 216 rid the signal of unwanted frequencies as previously discussed.

After passing through mix circuit 143, the signals are digitized by A/D convertor 144 of FIG. 12. The convertor 144 preferably has a dynamic range of at least 12 bits and digitization rate of 100 kHz to 1 MHz. Once digitized, the signals are stored in on-board array 145A of FIG. 12 and awaits the command from the host computer/controller 27 to begin transmission to the surface.

Flowchart 250

FIG. 17 illustrates operations of the detection steps in detail via flowchart 250. Assume that a logging station is at hand. Preamplification first occurs as indicated at 251. Next, a mixing occurs at 252. Thereafter, the signals are filtered, amplified and digitized at 253 and 254 after which a conditional statement at 255 permits transfer of the data uphole if the user does not wish the data to be Fourier transformed downhole. If Fourier transformation is desired, then the data is transferred to controller/microprocessor 80 via instructions 256 and 257 for such purposes. Thereafter, the Fourier transforms are transformed to the host computer via instructions 258 and 259.

In addition, to the acquisition of the digitized secondary field signals, three other data signals must be acquired The first is a flux monitor signal via the flux monitor 98 of FIG. 6. The output of the flux monitor 98 is proportional to the magnetic dipole moment of the transmission pulse, as previously mentioned. The signal from the flux monitor 98 is amplified and filtered prior to digitization. This signal is not mixed but is used to verify proper performance of the pulse power discharge circuit and to normalize the antenna signals to correct for pulse-to-pulse differences.

A spontaneous potential (SP) measurement and/or gamma ray measurement are also made. These are industry standard measurements and are used to correlate the present log with other logging tools.

Operations of the Logging Sonde

In the present invention, the operations are carried out by a properly programmed digital logging code and the integrated use of the host computer/controller at the earth's surface with the downhole control/microprocessors 80 and 140.

CODE CHARACTERISTIC

| DESTINATION | CODE | | | | |
|---|---|---|---|---|---|
| | Lead BIT | MINE | HIS | To HOST | From ME |
| Radiation Controller/Micro Processor 80 | 1 | 1 | 2 | 0 | 1 |
| Antenna Controller/Micro Processor 140 | 0 | 2 | 1 | 3 | 2 |
| ADDRESS ID's UART CONTROLLERS | | | | CODE | |
| Receiver Buffer Register | | | | A | |
| Transmit Buffer Register | | | | A | |
| Control | | | | B | |
| Status | | | | B | |
| Modem Control | | | | C | |
| Baud Select | | | | D | |
| | | | | DATARDY | |
| | | | | XMITRDY | |

In this regard UART's are designated as universal asynchronous receiver transmitter which act as parallel-to-serial convertors, while maintaining system format integrity.

Operation

1. The tool is lowered into the borehole with the wireline. During this period the tool status and communications are checked and verified. Background data acquisitions are taken to verify the proper operation of the preamplifiers.

2. When the tool is ready to be drawn up the borehole, the logging sequence is initiated. Wireline operators strongly prefer that the tool be drawn without stopping. When a tool is stopped in a borehole, it has a high probability of becoming stuck. One major advantage of a pulsed tool is that the data is unaffected by the draw rate so that the wireline operators constraints are decoupled from the quality of the data.

3. The tool is set to pulse at predetermined depths. The tool draw rate is selected to ensure that the tool is ready to fire when the predetermined depth is reached. Accurate depth information is provided continuously by the wireline truck to the host computer in the data truck.

4. When the fire command is given by the host computer, via pulse logging code, the following sequence of events occurs:

the data acquisition system is turned on;

the discharge circuit switch is closed to initiate the current pulse in the radiator coil;

data acquisition terminates approximately 2.5 milliseconds after the firing command;

the microprocessor in the command module initiates the recharging of the energy storage capacitors;

the microprocessor in the antenna module directs the output of each antenna's RAM, in turn, down one of two paths: (i) through a Fast Fourier process in firmware and then transmit the resulting data to the host computer on the surface at a 2400 baud data rate; (ii) directly to the host computer at 19,200 baud.

the data transmission to the surface is completed;

the storage capacitors re charged to the prescribed voltage;

the tool automatically does a status check of switch positions and communications links with each antenna;

the tool is ready for the next pulse when the prescribed depth is reached;

5. After pulsing the tool at selected intervals up the borehole the data acquisition is complete. The data now resides in the host computer.

During these steps, the microprocessor/controller 80 performs as follows: Control:

operate switch on the supply charging circuit;

operate switch on the discharge circuit;

operate switch to divert the current pulse through the dump resistor;

collect and transmit spontaneous potential and gamma log data (used to correlate with other logging tool);

Monitor:

tool electronics DC power levels;

charging voltage on the electrical power supply;

temperature in the command module electronics;

switch open or closed status:

The microprocessor/controller 140 in the antenna module performs the following functions:

Control:

turns on data acquisition channels;

sets mode (mixed or unmixed) of antenna channels;

sets controllable gains in the signal conditioning boards;

collects and transmits antenna data;

collects and transmits flux monitor data;

sets the antenna relays for data acquisition or background noise acquisition;

directs antenna and flux monitor data to the surface directly or to digital signal processing in the microprocessor.

Flowcharts FIGS. 18 and 19

In FIG. 18, the microprocessor/controllers are initialized and a status check is completed at steps 260, 261. Thereafter, the particular devices re caused to be called into operations as each serially answers the conditional queries of steps 262, 263, 264, 265 and 266. The object of the queries is to determine an appropriate command. Performance is then built around execution of steps 267, 268 and 269. If performance is not possible, steps 269A and 269B are executed.

In FIG. 19, operations of the antenna microprocessor/controller 140 are set forth in some details.

As shown, a reset command at 270 resets the address counter followed by the issuance of an acquire command at 271. Conditional time command at 272 directs the transfer of either a "1" or a "0" bit at steps 273, 275. The address counter is then reset at step 274.

Inversion Process

FIG. 20 and 21 illustrate processing of the data in accordance with the present invention.

Data Processing

The measurable data in a borehole are magnetic fields; a coil receiving antenna produces a voltage proportional to the time rate of change of magnetic flux threading the coil. Receiving coils may be oriented either vertically or horizontally; for the horizontally layered formation model it is sufficient to use vertical antennas; measuring formation dip angle of three-dimensional effects requires the use of horizontal antennas as well.

It may be shown by direct mathematical calculation that in order to determine formation electrical properties uniquely it is necessary to obtain magnetic data from a number of receiver antennas spaced vertically in the borehole. It is important to have the spatial information; measurements at different frequencies, which are readily available as a consequence of pulsed operation in the present invention, provide data more directly related to radial variations than to vertical layering. Vertical resolution of the present invention is directly related to the receiving antennas; the closer the vertical spacing the finer the resolution of the log.

There are practical limitations in antenna fabrication techniques and data acquisition electronics which limit available data and effect resolution and accuracy of the log. It is not sufficient to develop a mathematical relationship between borehole magnetic data and formation properties; the effects of electronic noise, finite antenna spacing, finite digital accuracy, and other practical problems must be taken into account. It may be demonstrated by direct numerical calculation that the mathematical relation between formation properties and field data is sensitive to noise or data corruption of any variety, whether electrical, mechanical, or digital. In addition to minimizing the sources of noise by novel antenna and circuit design, the present invention minimizes the effects of noise.

In a determinate data processing system the quantity of data acquired in the antenna module exactly equals the quantity of data specifying the layer model. This type of system is attractive from a mathematical perspective, but it has substantial practical problems. In a noise-free situation a determinate system exactly and uniquely reproduces the formation properties of a layer model; if magnetic fields are calculated from an assumed layered model to a very high degree of precision, and these values processed by the determinate system as though they were experimental data, then the formation parameters recovered by a determinate system agree exactly. Unfortunately this system is particularly vulnerable to error. If the simulated data is corrupted by additive noise the resulting formation properties deviate from the true value and cause a false reading. The determinate system does not provide satisfactory accuracy in an inductive logging system designed for field usage.

The present invention utilizes an overdetermined, redundant data processing system to minimize effects of noise and to maximize accuracy of the log. Magnetic data is acquired and digitized by the antenna module, with antenna locations as close as possible consistent with available data channels and desired vertical resolution. This data, consisting of a digitized representation of magnetic fields as a function of time, is processed by well known digital Fourier transform techniques to yield a representation of the field quantities in terms of their frequency spectrum. The number of frequency terms obtained in this process can be quite large, up to perhaps 2048, depending primarily on allocated computational resources and details of the pulse of the electromagnetic radiation source. The combination of magnetic field data at numerous antenna locations and numerous frequencies constitutes a matrix of data available for redundant signal processing. This situation is to be compared with prior art induction logging systems, in which the available data comprises one receiver antenna signal and one frequency.

In the preferred embodiment of the invention data is subdivided into several frequency regions in order to provide information relating to radial variations in formation properties. Within each frequency region, say for example 10 kHz to 15 kHz, the data from several frequencies and all antenna locations are collected and defined to be the target data matrix. It is the objective of the signal processing to determine formation properties that best match the target data, in the sense of minimizing the average error between calculated and target data.

Formation properties are determined in the present invention by systematically varying formation model parameters to find optimum values that minimize the mean square error between target magnetic field data and calculated model data. A first estimate of model parameters is made, based on an approximate solution to the field equations, and subsequently the values are improved by means of an iterative method until optimum model parameters have been determined. FIG. 20 is a flowchart of the preferred inversion process. As shown, digital data from pulsed operation of the tool arrives in matrix form. The radiating antenna and each of the receiving antennas is associated with a number of frequency components derived from the Fourier transform signal process. Each frequency component is a complex digital number representing amplitude and phase normalized with respect to the source.

Formation properties are represented by a matrix of values. For example, at 301 an initial estimate of formation properties is generated. In the preferred embodiment formation properties are represented by bed thickness, bed location, and bed conductivity; these properties may be augmented by dip angle and azimuthal variation. The dimension of the formation matrix (i.e. the total number of parameters to be determined) must be less than or equal to the dimension at the receiver antenna data matrix of 300. In the preferred embodiment, there are 13 receiver locations and two frequencies, corresponding to 26 complex numbers, or a total dimension of 52 real numbers in the receiver data matrix. There are 16 layers, each with a variable location, for a total of 32 real numbers in the formation property matrix. The inversion calculation is preformed once for each pair of frequencies; different calculations at different frequencies determine how the formation varies laterally from the borehole. In the preferred embodiment calculations are performed at frequencies of 5.0, 5.2, 10.0, 10.4 20.0, and 20.8 kHz. Electromagnetic fields at the above frequencies, are calculated at 302. Then the results of such calculations are evaluated at 303 such that the final formation values should be accurate within a tolerance range of five percent (5%) as determined at 304. If the final formation values are not within specification, the formation properties are re-evaluated at 305 using changed elements of a Gauss-Newton Matrix to yield updated estimate of formation properties at 306. The process is then repeated through loop 307. If the formation values are with specification limits as determined at 304, the in-range results are stored 308.

A forward solution of the electromagnetic equation is used to calculate the antenna matrix on the basis of specified formation properties. The preferred forward solution is a new analytical solution to the electromagnetic equations. Alternatively a layering technique based on Helmholtz potential theory may be used as in the manner of W. D. Kennedy, H. F. Morrison, S. M. Curry, S. P. Gill, "Induction Log Response in Deviated Boreholes"; Transactions of the SPWLA Annual Logging Symposium, Society of Professional Well Log Analysts, Houston, Tex.; Vol II, paper FFF, June 9–13, 1986.

The preferred solution represents an exact analytical solution to Maxwell's electromagnetic equations in a formation whose electrical properties vary in an arbitrary manner, continuous or discontinuous, in a specified direction. In the case of a non-dipping formation, the properties vary in the vertical direction only. The solution is for the case of a vertical source antenna and vertical receiver antennas.

In formation with specified electrical parameters, define the following complex functions, which in general are discontinuous functions of vertical position, changing abruptly at bed boundaries:

$$k = \sqrt{s^2 + j\omega\mu(\sigma + j\omega\epsilon)} \quad (1)$$

$$\beta = \ln\left(\frac{j\omega\mu}{k}\right)$$

$\sigma$ = formation conductivity
$\epsilon$ = formation dielectric value
$\mu$ = formation magnetic permeability
$s$ = real integration variable
$\omega$ = radian frequency These discontinuous functions are recursively integrated along the vertical axis to generate three continuous functions with specified initial conditions:

$$\frac{d\alpha}{dZ} = 2 k \sinh(\alpha - \beta) \quad (2)$$

$$\alpha(+\infty) = \beta(+\infty)$$

$$\frac{d\gamma}{dZ} = -2 k \sinh(\gamma - \beta) \quad (3)$$

$$\gamma(-\infty) = \beta(-\infty)$$

$$\frac{d\nu}{dZ} = -k \sinh(\beta - \alpha) \quad (4)$$

$$\nu(o) = -\ln[1 + \exp(\gamma(o) - \alpha(o))]$$

In these equations the vertical position z is equal to zero at the dipole source and increases in the positive direction toward the receiver antenna array located below the source.

The magnetic field at specified receiver location along the vertical axis is given by the following integral:

$$B = \frac{1}{2\pi j\omega} \int_o^\infty \exp(\nu) s^3 \, ds \quad (5)$$

Equation 5 represents the exact solution for the measured magnetic field, normalized with respect to the magnetic moment of the dipole source, for a formation with an arbitrary continuous or discontinuous variations in all electric parameters. The solution may be extended to include angle and azimuthal variations.

More specifically, in the prefereed induction logging system the formation is assumed to have constant magnetic permeability and negligible dielectric effects, and the formation parameters are given by bed thickness, bed location, and bed conductivity. Since conductivity is assumed to be constant within a bed, Equations 1 through 4 are integrated to provide simpler step by step recursion relations:

$$\alpha_{n-1} = \beta_n + \ln\left[\frac{\exp\alpha_n + \exp\beta_n \tanh k_n(Z_n - Z_{n-1})}{\exp\alpha_n \tanh k_n(Z_n - Z_{n-1}) + \exp\beta_n}\right] \quad (6)$$

$$\alpha_N = \beta_{N+1}$$
$$\nu_n = \nu_{n-1} - \ln[\cosh k_n(Z_n - Z_{n-1}) + \quad (7)$$
$$\exp(\beta_n - \alpha_n)\sinh k_n(Z_n - Z_{n-1})]$$

$$\nu_1 = -\ln[1 + \exp(\beta_1 - \alpha_1)]$$

In this simplified model, the formation properties are averaged above the source, and processed to vary only in the region sensed by the antenna array. In the preferred embodiment, there are 16 beds, which may be located anywhere below the source; the inversion process locates the beds and defines the bed conductivities.

The forward solution program steps are described in FIG. 21. A standard numerical quadrature integration routine, for example Laguerre integration, is used for the integration of the field strength in terms of the integration variables S via execution of step 311. Each value of S, from step 311 is then combined with the input material properties of step 311 to calculate layer functions at 312, and the results in turn are used to recursively evaluate the auxiliary functions defined in Eqs. 6 and 7 at step 313. After incremental integration of the B-field (Eq. 5) has been completed via execution of steps 314 and 315, the output of the forward solution at 316 are thus normalized receiver antenna signals (i.e. field strength per unit magnetic moment of the source) in the same data format as the experimentally measured data. Storage then occurs 317 as elements of a normalized receiver data matrix.

FIG. 22. illustrates the format of normalized receiver data matrix 320 in detail.

The matrix 320 comprises a frequency domain transformation of the original (amplitude v time/depth) detected secondary signals normalized to a logging station 1, 2, 3 . . . , as shown. It comprises a series of elements having an amplitude value A,A' . . . B,B' . . . C,C' associated in rows and columns identified with common antenna depth say, each element A,A' . . . B,B' . . . C,C' represents a component of the amplitude of the detected signal at each logging station and each also corresponds to a particular common frequency-antenna location. For example, for logging station 1 for common column ($f_o$), the elements are identified as $A_{1,fo}$; $A'_{2,fo}$; $A''_{3,fo}$; . . . $A^n{}_{13,fo}$ assuming the antenna array comprises thirteen (13) separate antenna groups where the row subscripts 1, 2 . . . 13 corresponds to each of such groups and the common column frequency subscript is $f_o, f_1 \ldots f_n$. Similarly for a particular common antenna depth number 1, 2 . . . or 13, at logging station (1), the elements are identified as $A_{1,fo}$; $A'_{1,f1}$; $A''_{1,f2}$; ... where the row subscripts ("1") corresponding to the common antenna group and the column subscripts corresponds to each of the frequency components $f_o$, $f_1$ . . . as shown.

"Frequency slicing" can occur about one or more columns of each matrix 320, say $f_1$-$f_3$. Moreover, such technique is employed in the present invention for investigation purposes.

Iterative Error Minimization

The preferred method for inverting the forward solution has been previously discussed in conjunction with FIG. 20. Recall that such method, used to determine formation property matrix from the antenna data matrix, is an iterative method that provides a best fit, in the least square error sense, to the measured data. This method best handles complications caused by non-ideal data that contains additive noise or perturbations from non-ideal formations. Additive noise arises from thermal effects in the antenna preamplifier circuitry and finite digitization in the analog-to-digital convertor circuitry.

Note that initial estimate of formation properties occurs at 301 in FIG. 21. This estimate may be a constant matrix or an approximate analytical estimate and is used with the forward solution to generate antenna signal data. The calculated antenna matrix is then compared with the measured data, and a mean square error evaluated, as described before in matrix format as indicated in FIG. 22.

The mean square error is an analytic function of the formation property matrix by virtue of the analytic forward solution expressed in Eqs. 1 to 5 and the Jacobean derivative can be evaluated. The Jacobean represents the derivative of the antenna signal matrix with respect to the formation parameter matrix, on a coefficient by coefficient basis. It may be calculated explicitly in forms of the analytic solution expressed in Eqs. 1 to 7 or it may be evaluated numerically. In the preferred embodiment the Jacobean differential coefficients are evaluated numerically by determining the ratio of antenna matrix variation to a small (1%) variation of formation properties.

The iteration procedure for obtaining an inverse solution in the preferred embodiment is the well known Gauss-Newton technique. The technique may be described by placing the contents of the measured antenna data matrix in a linear vector T, the calculated antenna matrix in a linear vector C, and the formation property matrix in a linear vector X. In the preferred embodiment T and C consist of 52 numbers.

The Jacobean is defined to be the matrix of differentials of the calculated value C with respect to the parameter values X:

$$J = \frac{\partial C}{\partial X} \quad (8)$$

The iteration proceeds from step n to step n+1 as follows:

$$X_{n+1} = X_n + (J^T J)^{-1} J^T (T - C_n) \quad (9)$$

The iteration proceeds until the change in successive values differs by a predetermined error value (typically 1%).

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. An apparatus for systematically logging an earth formation around a borehole using a logging sonde by generating a primary magnetic field in the formation at depth and detecting an induced secondary magnetic field indicative of a formation electrical parameter, comprising
   (i) means for generating a series of time spaced primary magnetic field pulses at a series of stations along the borehole; (ii) means for detecting response data relative to a secondary magnetic field induced in said formation by each said primary magnetic field pulse, and (iii) means for processing said response data to provide an indication of at least one electrical parameter of the formation around the borehole;
   wherein said processing means includes (a) means for modeling the response of the adjacent formation using a series of assumed conductivity and bed thickness values along with actual parameters of the pulsed primary field, and (b) means for cross-checking a forward solution of (a) against detected components of the secondary magnetic field.

2. The apparatus of claim 1 in which peak power of said primary field is at least one megawatt.

3. The apparatus of claim 1 in which the peak power of said primary field is about 50 megawatts.

4. The apparatus of claim 1 in which the peak power of said primary field is in the range of 1-100 megawatts.

5. The apparatus of claim 1 in which said means for detecting the secondary magnetic field includes (i) a series of antennas, each of which independently detect components of said secondary field associated with different formation regions, and (ii) means connected to said series of antennas for digitizing each detected component independently.

6. The apparatus of claim 1 in which said modeling means that provides the forward solution of (a) and said cross-checking means of (b) are carried out in the frequency domain.

7. The apparatus of claim 6 in which said processing means provides frequency transforms that can be frequency sliced to concentrate response about a frequency range R.

8. The apparatus of claim 6 in which R is about 1-40 kilohertz thereby yielding conductivity values.

9. The apparatus of claim 7 in which R is about 1-10 megahertz thereby yielding dielectric values.

10. The apparatus of claim 31 in which the frequency-depth transforms are in matrix format in which rows and columns designations are antenna depth and frequency.

11. An apparatus for systematically logging an earth formation around a borehole using a logging sonde by generating a primary magnetic field in the formation at depth and detecting an induced secondary magnetic field indicative of a formation electrical parameter, comprising
   (i) means for generating a series of time spaced primary magnetic field pulses of high peak power at a series of stations along the borehole, said generating means including a radiation coil and a power source network in selective operative contact therewith, said power source network including a magnetohydrodynamic (MHD) source and a switch network; (ii) means for detecting response data relative to a secondary magnetic field induced in said formation by each said primary magnetic field pulse, and (iii) means for processing said response data to provide an indication of at least one electrical parameter of the formation around the borehole.

12. The apparatus of claim 11 in which the MHD source generates said pulsed primary field by selectively driving a radiation coil with a pulsed oscillating current wherein the primary field energy per logging cycle is substantially constant.

13. The apparatus of claim 12 in which the peak power of said primary field is in a range of 10-1000 megawatts.

14. A method for systematically logging an earth formation around a borehole using a logging sonde to generate a primary magnetic field in the formation at depth and detecting an induced secondary magnetic field indicative of a formation electrical parameter, comprising the steps of:
 (i) generating a series of time spaced primary magnetic field pulses at a series of stations along the borehole;
 (ii) detecting response date relative to the secondary magnetic field induced in said formation by each said primary magnetic field pulse; and
 (iii) processing said response data to provide an indication of a formation electrical parameter around the borehole by (a) modeling response of the adjacent formation using a series of assumed conductivity and bed thickness values along with actual parameters of the pulsed primary field, and (b) cross-checking a forward solution of the model of step (a) against measured detected components of the secondary magnetic field at depth.

15. The method of claim 14 wherein the peak power of said primary field pulse is at least one megawatt.

16. The method of claim 14 wherein the peak power of said primary field pulse is about 50 megawatts.

17. The method of claim 14 wherein the peak power of said primary field pulse is in a range of 1-1000 megawatts.

18. The method of claim 14 wherein the step (ii) of detecting the secondary magnetic field includes the substeps (a) using a series of antennas, each of which independently detect components of said secondary field associated with different formation regions and (b) digitizing each detected component independently.

19. The method of claim 14 wherein the forward solution and the cross-checking of that solution against detected components of the secondary magnetic field at depth are carried out in the frequency domain.

20. The method of claim 19 in which the step of detecting the secondary magnetic field includes using a series of antennas in the sonde and wherein frequency transforms related to the instant depth of said antennas during each said pulse are used in the forward solution and cross checking steps.

21. The method of claim 20 in which the frequency transforms can be frequency sliced to concentrate response about a frequency range R.

22. The method of claim 21 in which R is about 1-40 kilohertz thereby yielding accurate conductivity values.

23. The method of claim 21 in which R is about 1-30 megahertz thereby yielding accurate dielectric values.

24. The method of claim 20 wherein the frequency transform are in matrix format in which row and column designations are antenna depth and frequency.

25. The method of claim 20 including the steps of mixing signals from adjacent antennas in said series of antennas in the sonde so that a digitized signal is produced which represents the second derivative or curvature of the magnetic field.

* * * * *

UNITED STATES PATENT AND TRADEMARK OFFICE
CERTIFICATE OF CORRECTION

PATENT NO. : 4,849,699

DATED : July 18, 1989

INVENTOR(S) : STEPHEN P. GILL, JOHN D. WATSON, KEITH O. BRINK

It is certified that error appears in the above-identified patent and that said Letters Patent is hereby corrected as shown below:

```
Col. 10, line 28, delete "18".
Col. 11, line 66, "an" should be --and--.
Col. 14, line  8, "re" should be --are-- .
Col. 16, line 46, "at" should be --of--.

Col. 18, line  4, before "angle", insert --dip--.
Col. 18, line 57, after "depth" and before "say", insert
      the following: --location and common component of
      frequency.  That is to--.
Col. 20, line 50, "claim 6" should be --claim 7--.
Col. 20, line 54, "claim 31" should be --claim 7--.
```

Signed and Sealed this

Twenty-fifth Day of September, 1990

*Attest:*

HARRY F. MANBECK, JR.

*Attesting Officer*  *Commissioner of Patents and Trademarks*